(12) United States Patent
Berk et al.

(10) Patent No.: US 10,102,764 B1
(45) Date of Patent: Oct. 16, 2018

(54) SYSTEMS AND METHODS WITH IMAGE CAPTURE DEVICE AND ASSESSMENT COMPUTING DEVICE FOR LEARNING ASSESSMENT

(71) Applicant: AltSchool, PBC, San Francisco, CA (US)

(72) Inventors: Sarah Katharine Berk, San Francisco, CA (US); Michael Ashley Martin, Lafayette, CA (US)

(73) Assignee: ALTSCHOOL, PBC, San Francisco, CA (US)

( * ) Notice: Subject to any disclaimer, the term of this patent is extended or adjusted under 35 U.S.C. 154(b) by 204 days.

(21) Appl. No.: 15/189,425

(22) Filed: Jun. 22, 2016

(51) Int. Cl.
*A63F 9/24* (2006.01)
*G09B 5/12* (2006.01)

(52) U.S. Cl.
CPC ...................... *G09B 5/12* (2013.01)

(58) Field of Classification Search
CPC ...................................................... G09B 5/012
See application file for complete search history.

(56) References Cited

U.S. PATENT DOCUMENTS

| | | | | |
|---|---|---|---|---|
| 5,672,060 A * | 9/1997 | Poor | ........................ | G09B 7/02 382/321 |
| 7,958,010 B2 * | 6/2011 | Huang | ............... | G06F 17/30864 705/26.7 |
| 2004/0175687 A1 * | 9/2004 | Burstein | ................. | G06F 17/27 434/353 |
| 2005/0223002 A1 * | 10/2005 | Agarwal | ........... | G06F 17/30864 |
| 2009/0325661 A1 * | 12/2009 | Gross | ...................... | A63F 13/12 463/9 |
| 2011/0225169 A1 * | 9/2011 | Kurian | ................... | G06Q 10/06 707/748 |
| 2013/0166459 A1 * | 6/2013 | Mohanty | ................ | G06Q 10/10 705/310 |
| 2015/0169602 A1 * | 6/2015 | Shankar | ............ | G06F 17/30091 707/825 |
| 2016/0048934 A1 * | 2/2016 | Gross | ................. | G06K 9/00637 705/313 |
| 2018/0012109 A1 * | 1/2018 | Kriegman | ................ | G06K 9/62 |

OTHER PUBLICATIONS

Mead, Rebecca, "Learn Different, Silicon Valley disrupts education," The New Yorker Online Article dated Mar. 7, 2016. Retrieved on Aug. 29, 2016, http://www.newyorker.com/magazine/2016/03/07/altschools-disrupted-education.

* cited by examiner

*Primary Examiner* — Steve Rowland
(74) *Attorney, Agent, or Firm* — Foley & Lardner LLP

(57) ABSTRACT

A system includes an image capture device and an assessment computing device. The image capture device is configured to capture an image of an object and a first score associated with the object on a first scale. The assessment computing device is configured to receive the image of the object and the first score from the image capture device, and to receive a second score on a second scale that is different from the first scale from a third party assessment source computing device. The assessment computing device is also configured to normalize the second score to a particular scale to provide a normalized second score, and to determine a level of mastery based at least partially on the first score and the normalized second score. The assessment computing device is configured to generate a user interface with information indicating the level of mastery.

18 Claims, 23 Drawing Sheets

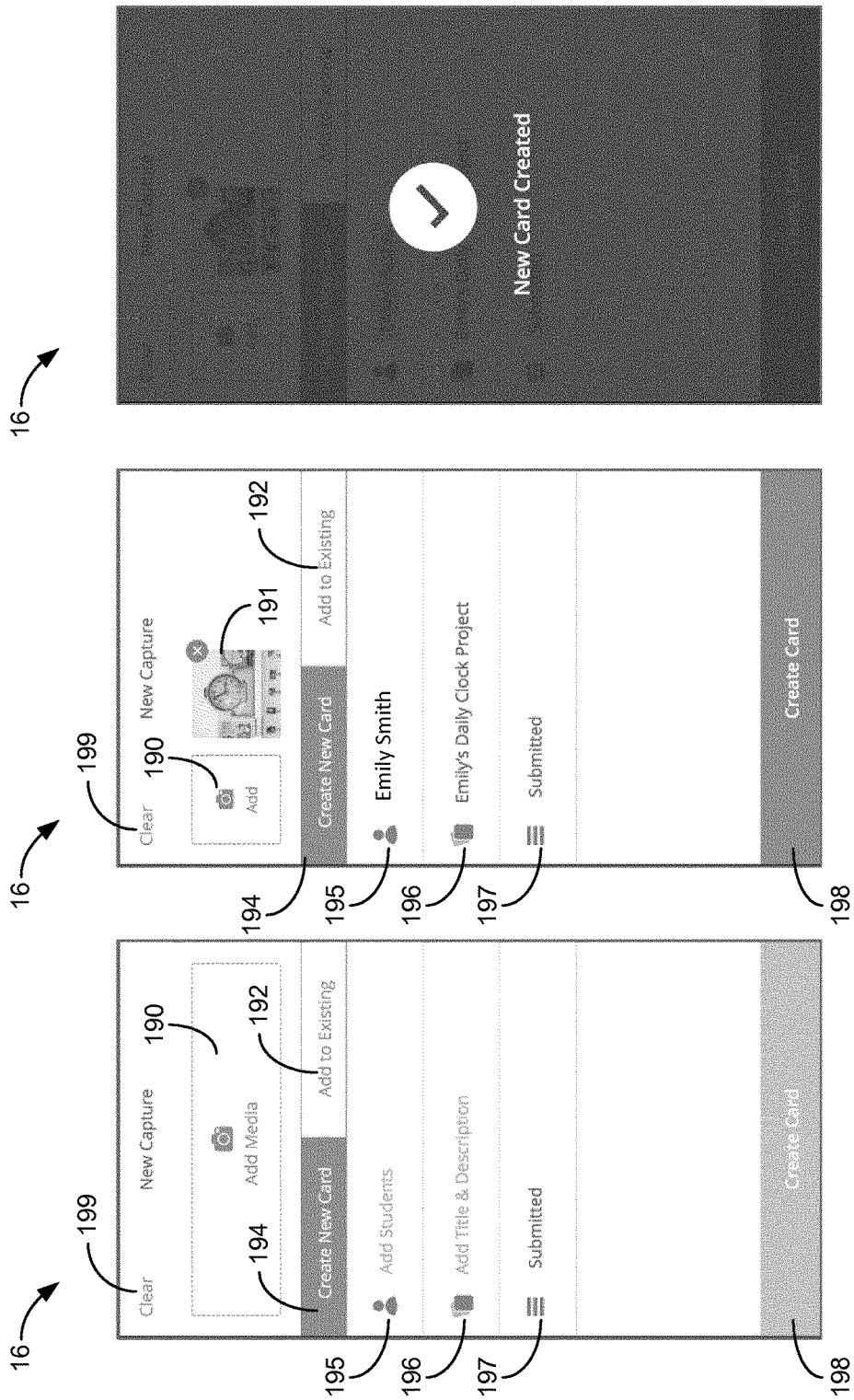

generating, by the assessment computing device, the user interface as an interactive user interface to permit interacting with learning progression information for a student to obtain more detailed information for selections made within the user interface — 801

FIG. 25 automatically suggesting, by the assessment computing device, personalized activities for a student based at least partially on a plurality of scores received from different sources over a network by the assessment computing device — 901

FIG. 26 automatically determining, by the assessment computing device, a grouping of students from among a plurality of students for an activity based at least partially on a grouping strategy and learning progressions of each of the plurality of students — 1001

FIG. 27 generating, by the assessment computing device, the user interface to show for each of a plurality of domains within a subject a level of mastery of a student for the domain, and to be interactive to permit requesting additional information in the user interface for levels of proficiency of a student with respect to one or more standards corresponding to a selected domain — 1101

FIG. 28

SYSTEMS AND METHODS WITH IMAGE CAPTURE DEVICE AND ASSESSMENT COMPUTING DEVICE FOR LEARNING ASSESSMENT

FIELD

The present disclosure relates generally to systems and methods with image capture devices and assessment computing devices for learning assessment. Various embodiments further relate to interactions over a network with third party assessment source computing devices as well as the providing of a user interface over a network to a user computing device.

BACKGROUND

Many devices are employed in learning environments by students and teachers. There are also many sources of competency-based assessment data for students, including in-classroom activities as well as outside activities, such as online third-party educational tools and the like. Such varied assessment sources may be scored on a variety of scales using a variety of educational standards. Students, teachers, and administrators, as well as parents and guardians of the students, are often very interested in scores on homework, projects, and tests as a way of determining whether the students are learning various concepts and subject matter, and are generally interested in new devices and technology for aiding in educational advancement.

SUMMARY OF THE DISCLOSURE

Systems and methods in accordance with various embodiments include an image capture device, an assessment computing device, one or more recording devices, a trigger device, a computing device, a printer, and a user computing device, and allow for learning progression analysis and assessment. In various embodiments, the assessment computing device is connected to a network to receive scores and other information from various sources, such as from the image capture device, the computing device, the user computing device, and third party assessment source computing devices.

Systems and methods in accordance with various embodiments allow for aggregating, normalizing, and interpreting competency-based assessment data from the various sources to give a comprehensive mastery score for a given standard. Various embodiments provide for a learning progression analysis that takes competency-based assessment data from any standards-based source including existing education tools and educator assessments, normalizes those scores to a particular mastery scale, such as a five point mastery scale, and applies an algorithm to determine if a student has mastered a specific standard. Various embodiments allow educators to see a map of all standards for a student showing what they have been exposed to and what they have mastered, even if the student is working across multiple digital tools and with multiple educators inputting assessment data over many years.

Systems and methods in accordance with various embodiments aggregate data from any standards or competency-based assessment source. Sources include, for example, third party tools such as Khan Academy®, TenMarks®, and/or the like, as well as educator input assessments via a playlist, directly into a learning progression user interface, via an image capture mobile application that captures learning moments as they happen in the classroom, via printed Quick Response (QR) codes attached to paper-based work, and/or the like. Various embodiments normalizes the received data to a standard master scale, such as a five point scale or the like, and apply an algorithm to determine if a student has mastered a given standard. Various embodiments display an exposure and mastery standards map with the mastery data to demonstrate a student's learning frontier, gaps, and strengths. In various embodiments, systems and methods for learning progression analysis can be adapted to work with any standard set, such as Common Core Standards, Next Generation Science Standards, state standard sets, International Baccalaureate standards, custom standard sets, and/or the like. Also, in various embodiments the learning progression data is used by the system to suggest personalized work, activities, and/or goals for a given student as well as to do smart groupings of students and otherwise make personalized recommendations.

A system in accordance with various embodiments includes an image capture device and an assessment computing device. In various embodiments, the image capture device is configured to capture an image of an object and a first score associated with the object on a first scale. In various embodiments, the assessment computing device is configured to receive the image of the object and the first score from the image capture device, and is configured to receive a second score on a second scale that is different from the first scale from a third party assessment source computing device. In some embodiments, the assessment computing device is also configured to normalize the second score to a particular scale, such as the first scale, to provide a normalized second score, and is configured to determine a level of mastery based at least partially on the first score and the normalized second score. Also, in some embodiments, the assessment computing device is further configured to generate a user interface with information indicating the level of mastery.

In various embodiments, the system further includes a printer and a computing device. In some embodiments, the computing device is configured to generate a request to the assessment computing device for a label to be printed by the printer that is affixable to the object. In some embodiments, the assessment computing device is further configured to generate the label to include encoded data that is readable by the image capture device and a score input area in which the first score is to be indicated. In various embodiments, the system further includes one or more recording devices and a trigger device. In some embodiments, the one or more recording devices are configured to capture video from a learning environment in which the object is located, and to provide one or more files with the captured video to the assessment computing device. In some embodiments, the trigger device is configured to supply a trigger signal to the assessment computing device in response to an action of a user. In some embodiments, the assessment computing device is further configured to flag a location in the one or more files based on a time associated with the trigger signal.

In various embodiments, the assessment computing device is configured to receive scores from a plurality of third party assessment source computing devices for a student, and is configured to receive scores for a plurality of educator assessments for the student, and is configured to determine whether the student has mastered a particular standard based at least partially on the scores received from the plurality of third party assessment source computing devices and the scores received for the plurality of educator assessments. In some embodiments, the assessment computing device is configured to generate the user interface to include information for a plurality of domains within a subject and a plurality of grade levels, and to provide an indication for each domain of the plurality of domains and grade level of the plurality of grade levels to indicate a corresponding level of mastery of the domain at the grade level by a student based on a plurality of scores received from different sources over a network by the assessment computing device.

In various embodiments, the assessment computing device is configured to generate the user interface to display a summary of progress of a student with respect to a plurality of standards associated with a domain of a subject, and the assessment computing device is configured to determine the progress of the student with respect to the plurality of standards based at least partially on a plurality of scores received from different sources over a network by the assessment computing device. In some embodiments, the assessment computing device is configured to generate the user interface as an interactive user interface to permit interacting with learning progression information for a student to obtain more detailed information for selections made within the user interface.

In some embodiments, the assessment computing device is configured to automatically suggest personalized activities for a student based at least partially on a plurality of scores received from different sources over a network by the assessment computing device. Also, in some embodiments, the assessment computing device is configured to automatically determine a grouping of students from among a plurality of students for an activity based at least partially on a grouping strategy and learning progressions of each of the plurality of students. In various embodiments, the assessment computing device is configured to generate the user interface to show, for each of a plurality of domains within a subject, a level of mastery of a student for the domain, and to be interactive to permit requesting additional information in the user interface for levels of proficiency of a student with respect to one or more standards corresponding to a selected domain.

A method in accordance with an embodiment includes capturing with an image capture device an image of an object and a first score associated with the object on a first scale. In various embodiments, the method further includes receiving, by an assessment computing device, the image of the object and the first score from the image capture device. In various embodiments, the method further includes receiving, by the assessment computing device, a second score on a second scale that is different from the first scale from a third party assessment source computing device. In some embodiments, the method further includes normalizing, by the assessment computing device, the second score to a particular scale to provide a normalized second score. In various embodiments, the method further includes determining, by the assessment computing device, a level of mastery based at least partially on the first score and the normalized second score. Also, in various embodiments, the method further includes generating, by the assessment computing device, a user interface with information indicating the level of mastery.

In various embodiments, the method further includes generating, by a computing device, a request to the assessment computing device for a label to be printed by a printer that is affixable to the object. In various embodiments, the method further includes generating, by the assessment computing device, the label to include encoded data that is readable by the image capture device and a score input area in which the first score is to be indicated. In some embodiments, the method further includes capturing, by one or more recording devices, video from a learning environment in which the object is located. In various embodiments, the method further includes providing, by the one or more recording devices, one or more files with the captured video to the assessment computing device. In some embodiments, the method further includes supplying, by a trigger device, a trigger signal to the assessment computing device in response to an action of a user, and flagging, by the assessment computing device, a location in the one or more files based on a time associated with the trigger signal.

In various embodiments, the method further includes receiving, by the assessment computing device, scores from a plurality of third party assessment source computing devices for a student. In some embodiments, the method further includes receiving, by the assessment computing device, scores for a plurality of educator assessments for the student. Also, in some embodiments, the method further includes determining, by the assessment computing device, whether the student has mastered a particular standard based at least partially on the scores received from the plurality of third party assessment source computing devices and the scores received for the plurality of educator assessments. In various embodiments, the assessment computing device generates the user interface to include information for a plurality of domains within a subject and a plurality of grade levels, and to provide an indication for each domain of the plurality of domains and grade level of the plurality of grade levels to indicate a corresponding level of mastery of the domain at the grade level by a student based on a plurality of scores received from different sources over a network by the assessment computing device.

In various embodiments, the method further includes determining, by the assessment computing device, the progress of a student with respect to a plurality of standards based at least partially on a plurality of scores received from different sources over a network by the assessment computing device. In various embodiments generating the user interface includes generating, by the assessment computing device, the user interface to display a summary of progress of the student with respect to the plurality of standards. In various embodiments generating the user interface includes generating, by the assessment computing device, the user interface as an interactive user interface to permit interacting with learning progression information for a student to obtain more detailed information for selections made within the user interface.

In various embodiments, the method further includes automatically suggesting, by the assessment computing device, personalized activities for a student based at least partially on a plurality of scores received from different sources over a network by the assessment computing device. In various embodiments, the method further includes automatically determining, by the assessment computing device, a grouping of students from among a plurality of students for an activity based at least partially on a grouping strategy and learning progressions of each of the plurality of students. In various embodiments generating the user interface includes generating, by the assessment computing device, the user interface to show for each of a plurality of domains within a subject a level of mastery of a student for the domain, and to be interactive to permit requesting additional information in the user interface for levels of proficiency of a student with respect to one or more standards corresponding to a selected domain.

BRIEF DESCRIPTION OF THE DRAWINGS

FIG. 9 shows a card screen of a user interface according to an exemplary embodiment;

FIG. 12 shows an example of a summary report generated to indicate the progress of a student in accordance with an embodiment;

FIG. 17 shows a class capture tool according to an exemplary embodiment;

FIG. 18 shows a class capture tool according to an exemplary embodiment;

FIG. 19 shows a class capture tool according to an exemplary embodiment;

FIG. 25 shows a method in accordance with an embodiment;

FIG. 26 shows a method in accordance with an embodiment;

FIG. 27 shows a method in accordance with an embodiment; and

FIG. 28 shows a method in accordance with an embodiment.

DETAILED DESCRIPTION

Referring generally to the figures, systems and methods are described for assisting in various functions related to a learning environment, such as a classroom. Systems and methods in accordance with various embodiments aid in the analysis of learning progression by aggregating, normalizing, and interpreting data from a variety of sources to provide comprehensive mastery scores for given standards. Various embodiments allows for students, teachers, administrators, parents, and guardians to easily track the mastery of various standards and subjects by each student. Various embodiments enable educators to understand and track student exposure, competence, and confidence scores for various standards and also enable parents and guardians to understand student progress against those standards.

Figure 1:
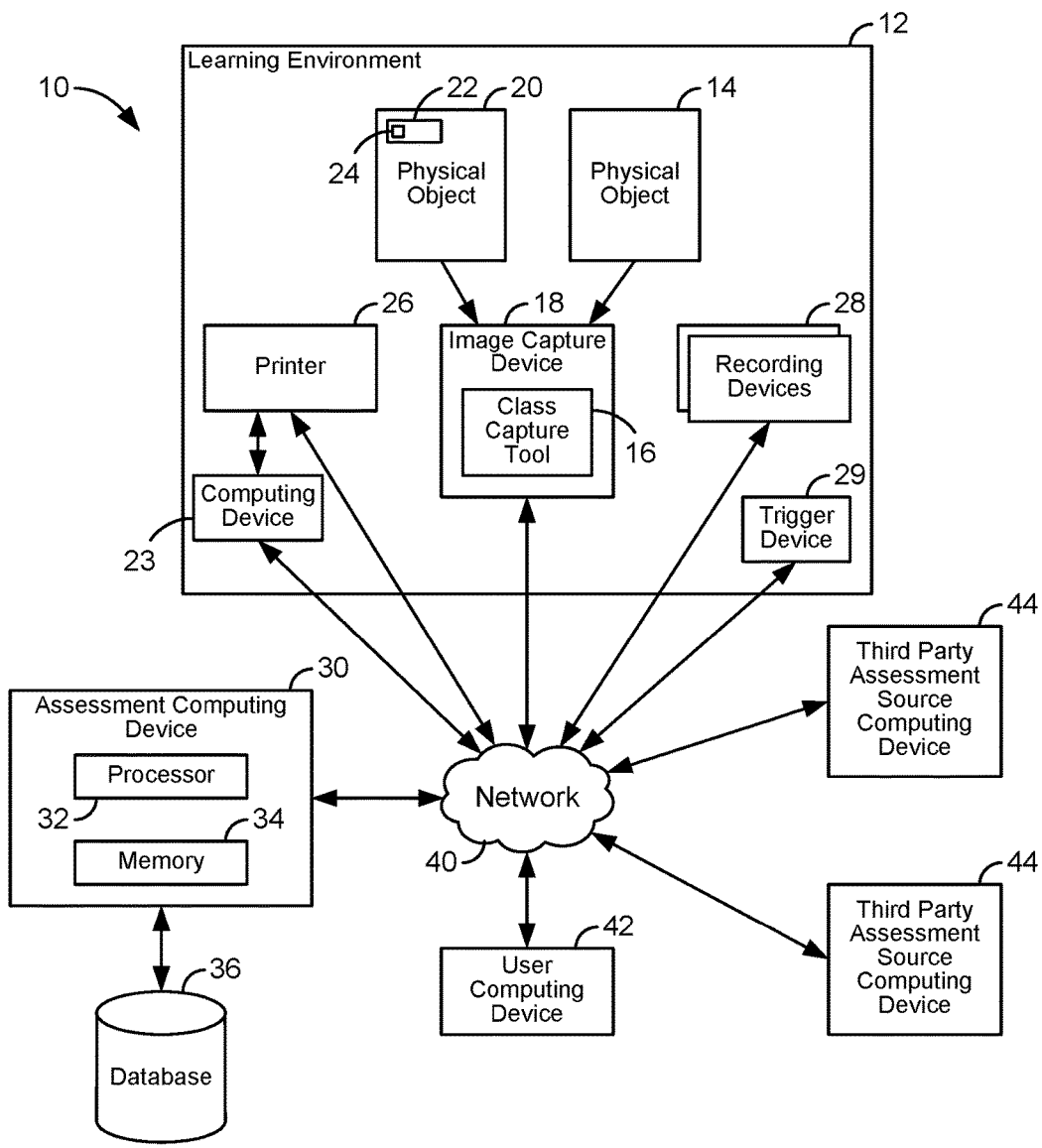
FIG. 1 illustrates a system for aggregating and normalizing assessment data from a variety of sources and for monitoring student learning progression according to an exemplary embodiment.

Referring to FIG. 1, a system 10 for aggregating and normalizing assessment data from a variety of sources and for monitoring learning progression is shown according to an exemplary embodiment. In various embodiments, the system 10 includes an image capture device 18, a computing device 23, a printer 26, one or more recording devices 28, a trigger device 29, an assessment computing device 30, a database 36, a network 40, a user computing device 42, and one or more third party assessment source computing devices 44. In various embodiments, the system 10 is configured to collect competency-based assessment data from any standards-based sources or other sources, including existing education tools, educator assessments, third-party assessments, and the like. In various embodiments, the system 10 is further configured to normalize those scores to a common scale and apply one or more algorithms to determine whether one or more students have mastered one or more learning standards. In some embodiments, the system 10 is configured to display or print a map of all standards for a student to show what the student has been exposed to, what the student has mastered, and what the student has yet to learn. Also, in some embodiments, the system 10 is configured to track and display grade level progression based on existing standards to allow for tracking the academic performance of students over an extended time period.

Assessment data related to a student may be collected from a variety of sources, both from within a learning environment 12 and from outside sources. As described in more detail below, assessment data may be recorded by the assessment computing device 30 as individual digital "cards," which may include records, entries, and the like associated with a student. In various embodiments, the assessment computing device 30 includes a processor 32 and memory 34 and communicates with the database 36.

In some embodiments, assessment data is collected from a physical object 14, such as a three-dimensional project, a presentation, diorama, worksheet, homework, test, document or the like, using a class capture tool 16. In various embodiments, the class capture tool 16 is an application loaded onto the image capture device 18. The class capture tool 16 is described in more detail below, with regards to FIGS. 17, 18, and 19. Referring to FIG. 1, in various embodiments the image capture device 18 is any device capable of capturing an image and transmitting the image data to the assessment computing device 30, either directly or indirectly such as via the network 40, such as a local area network (LAN), a wide area network (WAN), the Internet, a cellular network, a wireless network, or the like. For example, in some embodiments, the image capture device 18 is a digital camera, a mobile phone, a tablet, a scanner, or other electronic device that stores image data of the physical object 14 as an electronic file. In various embodiments, the class capture tool 16 as executed by the image capture device 18 is configured to attach the image data to an existing digital card or to use the image data to create a new digital card. In various embodiments, the digital card is grouped with other digital cards into a playlist associated with a student. In some embodiments, the playlist is associated with a student's portrait or information, which includes profile information, personal learning plans, and various goals for the student.

In various embodiments, the image capture device 18 is configured to capture the image data and to input further information such that the image data is accompanied by a score that is assigned by an instructor. In an exemplary embodiment, the score is on a five-point scale indicative of how well the instructor believes the physical object 14, such as a project or document, demonstrates a mastery of a learning objective. In some embodiments, the image capture device 18 is configured such that the score is entered by the instructor into the image capture device 18 when using the image capture device 18 to create a digital card or attaching the image data to an existing digital card. In some embodiments, the score may be entered at a later time after capturing the image data an may then be associated with the image data. In some embodiments, the class capture tool 16 executing on the image capture device 18 is configured to use recognition algorithms to read a score that is marked directly on the physical object 14 and to associate the score with captured image data.

In some embodiments, the image capture device 18 is configured to collect assessment data from a physical object 20, such as a project, document, or the like, that is tagged with a label 22 including a machine-readable code 24. In some embodiments, the computing device 23 is configured to provide a signal to the printer 26 to generate the label 22 for the physical object 20. The computing device 23 may be, for example, a computer, a tablet, a handheld device, or other device in the learning environment 12 that is connected to, integrated with, or capable of communicating with the printer 26 either directly or through the network 40.

Figure 2:
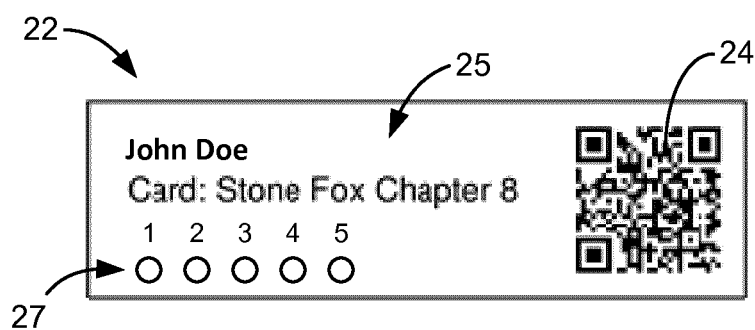
FIG. 2 shows a label according to an exemplary embodiment.

Referring to FIG. 2, the label 22 is shown according to an exemplary embodiment. With reference to FIGS. 1 and 2, in various embodiments, the computing device 23 is configured to create the machine-readable code 24 such that the machine-readable code 24 is encoded with a variety of information to associate the physical object 20 with a student. For example, the machine-readable code 24 may encode a variety of information including, but not limited to, a student's name, a class name, a lesson, a chapter, an assignment number, etc. In some embodiments, the computing device 23 is configured to create the machine-readable code 24 as a quick response (QR) code. In some embodiments, the machine-readable code 24 is a bar code or other suitable code. In some embodiments, the computing device 23 is configured to create the label 22 to include additional information 25 such as the student's name, the class name, the lesson name, the chapter, the assignment number, an associated card, and/or the like, in printed form that may be read by a person. In some embodiments, the computing device 23 is configured to create the label 22 to include a score input area 27, such as an area with a series of empty shapes for bubbling in to indicate a score. In some embodiments, the computing device 23 is configured to create the label 22 as a Portable Document Format (PDF) file that is provided to the printer 26 for printing to be applied to the physical object 20. The label 22 may have any desirable size, and in one exemplary embodiment the label 22 has a width of 3.2 inches and a height of 1.125 inches.

In some embodiments, the computing device 23 is configured such a student is permitted to login to generate and print the label 22 with the printer 26 and then affix the label 22 to the physical object 20 that is to be turned in for assessment. For example, a student may initiate the printing of the label 22 with the personal computing device 23, such as a desktop computer, single board computer, tablet, etc. that is configured to communicate with the printer 26 to print the label 22. In some embodiments, the printer 26 is shared with a specific student classroom group or other subset of students within the learning environment 12. In some embodiments, the printer 26 is configured to print self-adhesive labels that can be affixed to 8 objects or documents. Once the label 22 has been affixed to the physical object 20, an instructor may review the physical object 20, such as a project, homework assignment, test, or the like, and assign a score that is written by the instructor on the label 22. The score may be indicated, for example, by filling in an empty shape in the score input area 27 of the label 22.

In various embodiments, the image capture device 18 is configured for use by the instructor to then capture an image of the label 22 and the physical object 20 to which it is affixed, and is configured to read the machine-readable code 24 from the label 22. In some embodiments, the machine-readable code 24 is read using the class capture tool 16 loaded onto and running as an application on the image capture device 18. In various embodiments, the image capture device 18 is configured such that upon capturing the machine-readable code 24 the image capture device 18 automatically generates a digital card for the physical object 20 including the information encoded in the machine-readable code 24. In some embodiments, the image capture device 18 is configured to read the score from the score input area 27 of the label 22 using optical mark recognition. In some embodiments, the image capture device 18 is configured to read a score using recognition algorithms to read a score that is marked directly on the physical object 20 or on the label 22. In some embodiments, a score may be entered at a later time.

In some embodiments, assessment data is collected from video and/or audio data captured from the learning environment 12 utilizing the one or more recording devices 28. In various embodiments, the one or more recording devices 28 are configured to capture video and/or audio in the learning environment 12 and to provide video and/or audio files to the assessment computing device 30 via the network 40. In some embodiments, the one or more recording devices 28 include stationary devices, such as cameras, microphones, or environment sensors for monitoring a state of the learning environment 12, such as temperature or light sensors. In some embodiments, the one or more recording devices 28 include wearable devices that can be worn by students to monitor student locations, actions, body states, and/or other events. In some embodiments, the one or more recording devices 28 are configured to monitor student's computing devices, such as computers, tablets, smart phones, and the like, to track studying efforts, test taking, and the like, and allow for controlling content sent to each student computing device based on the monitored data. Visual and audio data may be recorded and stored using a multitude of recording devices as the one or more recording devices 28, such as described in U.S. patent application Ser. No. 14/668,757, filed Mar. 25, 2015, which is incorporated herein by reference in its entirety.

In various embodiments, the data collected by the one or more recording devices 28 is utilized, for example, for identifying learning moments, identifying an effectiveness of a teacher or of tools in the learning environment 12, identifying distractions or disruptive behavior in the learning environment 12, observing a performance of one or more students or teachers, monitoring activity, and/or providing other functions that can be used to assist in an educational process. In various embodiments, the assessment computing device 30 is configured to use facial recognition algorithms to identify individuals in the recorded data from the one or more recording devices 28. In various embodiments, the data captured by the one or more recording devices is attached to an existing digital card or may be used to create a new digital card.

In various embodiments, a teacher or other individual is able to flag a portion of the recorded data from the one or more recording devices 28, such as an audio clip, a video clip, or the like, with a bookmark for later review. In various embodiments, the electronic trigger device 29 has a switch, button, user interface, or the like for receiving input, and also includes wireless communication circuitry for communication with the one or more recording devices 28 and/or the assessment computing device 30, and is sized to allow for mobile use by a teacher or other individual. In various embodiments, if a teacher observes notable behavior from a student or other notable event in the learning environment 12, the teacher is able to activate the trigger device 29 to flag the recorded data that is being captured at that moment by the one or more recording devices 28. In various embodiments, when a moment is flagged through activation of the trigger device 29, the one or more recording devices 28 and/or the assessment computing device 30 receive the trigger signal from the trigger device 29 and include an identifier with the data or files captured at the moment of the trigger signal to associate the trigger event with the captured data or files.

By recording the trigger events by the trigger device 29 with the recorded data from the one or more recording devices 28, a teacher or other individual may then review only the flagged moments instead of the full length recorded data to conserve time when looking for specific events in the recorded data. In some embodiments, other individuals in the learning environment 12, such as fellow students, observers, administrators, and/or the like, may use the trigger device 29 to flag a portion of the recorded data, such as an audio clip, a video clip, or the like, with a bookmark for later review. In some embodiments, the flagged portion of the recorded data may include meta-data to give context to the recorded data. Meta-data may include, for example, a timestamp, the name of the lesson being taught, and the names of the individuals involved, such as the students, teachers, or the like. In various embodiments, the assessment computing device 30 is configured to use facial and/or voice recognition algorithms to identify individuals in the recorded data and to add information about the individuals to the meta-data associated with the recorded data.

In some embodiments, assessment data is directly created or entered by a student, teacher, parent, guardian, or other individual. In some embodiments, assessment data is entered directly, for example, with a user computing device 42, such as a computer, tablet, smartphone, or the like, that is in communication with the assessment computing device 30 via the network 40 and transmits assessment data over the network 40 to the assessment computing device 30. In some embodiments, assessment data is created as an electronic document using the user computing device 42 and is transferred to the assessment computing device 30. The document may be transmitted to the assessment computing device 30 via the network 40 or via a storage medium in communication with the assessment computing device 30, such as a Universal Serial Bus (USB) storage drive or the like. Assessment data that is directly created or entered by a student may be later reviewed by an instructor and assigned a score, such as a score based on a 5-point scale. In some embodiments, assessment data that is directly created or entered by a student includes self-assessment and/or peer assessment.

In some embodiments, assessment data is collected from the one or more third party assessment source computing devices 44. In various embodiments, the one or more third party assessment source computing devices 44 are any education resource computing devices that provide standards and/or competency-based assessment data, such as computing devices for Khan Academy®, TenMarks®, Lexia®, Dreambox®, Newsela®, or the like. Many students use one or more online sources, such as the above-mentioned third party sources for additional learning. The use of third party assessment sources allows for a student to utilize a variety of learning environments and strategies. In various embodiments, a variety of learning sources are employed to provide a better overall assessment of the student's progression and mastery of a subject. In various embodiments, the assessment computing device 30 is configured to collect assessment data from the one or more third party assessment source computing devices 44 over the network 40 at a variety of intervals. For example, the assessment data may be collected daily, weekly, monthly, or at another interval. In some embodiments, the assessment data is automatically pushed by the one or more third party assessment source computing devices 44 to the assessment computing device 30 over the network 40 when available or at some interval of time. In some embodiments, the assessment computing device 30 is configured to request the assessment data from the one or more third party assessment source computing devices 44 over the network 40. In some embodiments, the assessment computing device 30 is configured to collect the assessment data from each of the one or more third party assessment source computing devices 44 using an application programming interface (API) provided by the corresponding third party assessment source for communicating with the corresponding third party assessment source computing device 44.

Each of the third party assessment sources associated with the one or more third party assessment source computing devices 44 may score the student's work on a different scale using different criteria. For example, a first third party assessment source may score a student's work on a 1-7 scale while a second third party assessment source may score a student's work on a 1-50 scale, an yet another third party assessment source may score a student's work on an A-F scale. Further, the scales utilized by the various third party assessment sources may be differently skewed, with the numbers on the scale being differently weighted towards different levels of mastery of a subject. As described in more detail below, in various embodiments the assessment computing device 30 is configured to standardize the scores received from the one or more third party assessment source computing devices 44 to a single, common scale.

In some embodiments, the assessment computing device 30 is configured to weight the assessment data from the one or more third party assessment source computing devices 44 differently based on the trustworthiness of each third party assessment source and/or the overall assessment data for the student. In some embodiments, the assessment computing device 30 is configured to arbitrate disagreements between the assessment data from different third party assessment sources. For example, if assessment data received from a first third party assessment source computing device 44 indicates that a student has not mastered a subject while assessment data received from other third party assessment source computing devices 44 indicate that the student has mastered the subject, the assessment computing device 30 may weigh the assessment data from the various third party assessment sources 44 differently.

In various embodiments, the assessment computing device 30 is configured to analyze aggregate scores from various sources, such as photos of projects or documents, scanned codes or labels, directly created online documents, third party source assessment data, and/or the like, and to compare the scores against various educational standards. In various embodiments, the assessment computing device 30 is configured to determine a proficiency of a student in various subjects based on the student's performance according to the various educational standards. In various embodiments, the assessment computing device 30 is configured to track a learning progression of the student by analyzing the proficiency of the student in various subjects over time based on the collected assessment data. Also, in various embodiments, the assessment computing device 30 is configured to provide tools of varying scopes for a user, such as a teacher, parent, student, administrator, or other individual, to view the proficiency and progression of one or more students.

Figure 3:
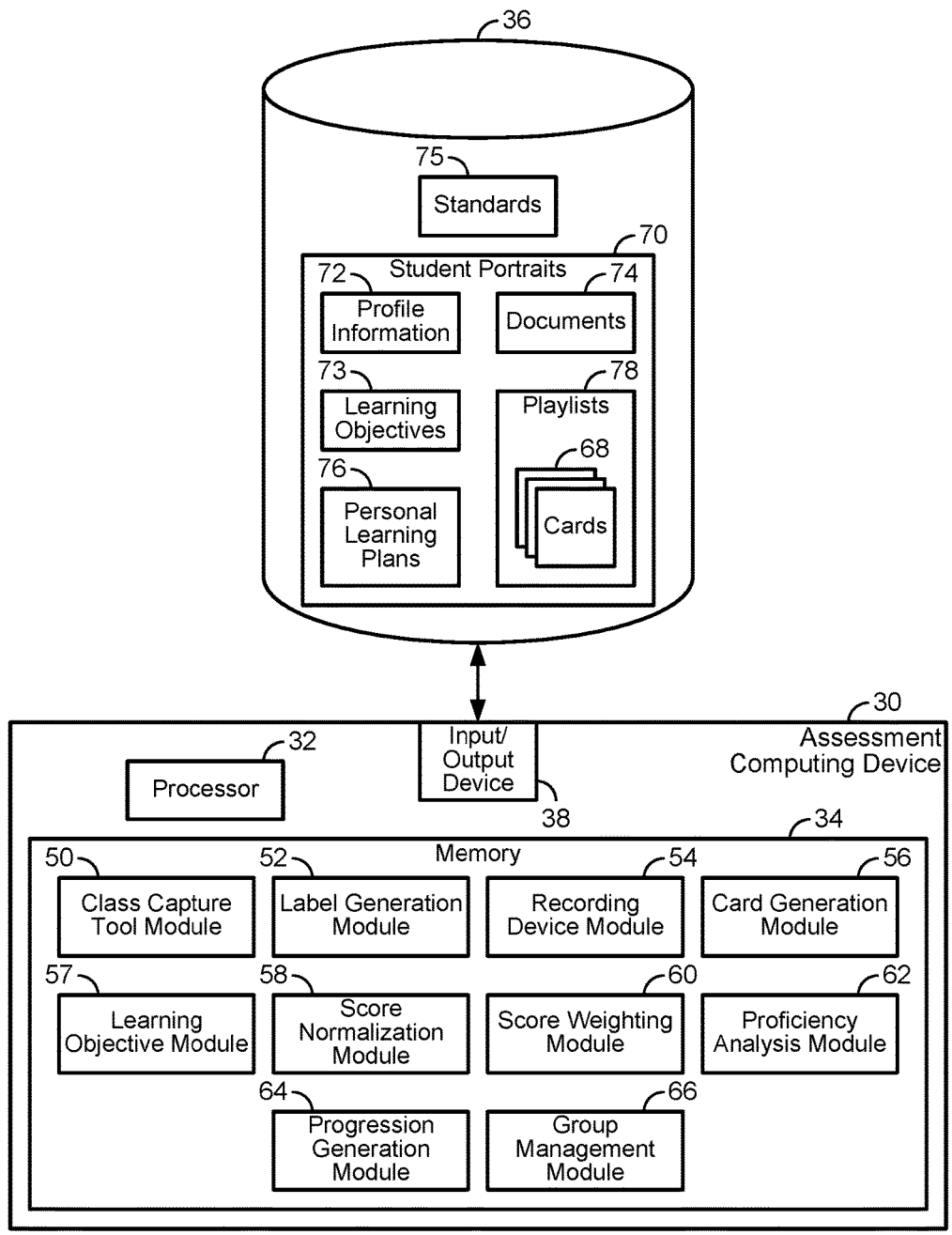
FIG. 3 shows an assessment computing device and a database in communication with the assessment computing device according to an exemplary embodiment.

Referring now to FIG. 3, the assessment computing device 30 and the database 36 in communication with the assessment computing device 30 are shown in more detail, according to an exemplary embodiment. In various embodiments, the assessment computing device 30 includes the processor 32 and memory 34 and communicates with the database 36 via an input/output device 38. In various embodiments, the assessment computing device 30 includes a server computer, or the like. In some embodiments, the assessment computing device 30 includes multiple computers connected together for processing, or multiple processors communicating together for processing. In some embodiments, the assessment computing device 30 is a cloud computing device. In some embodiments, the database 36 is implemented on the assessment computing device 30. In some embodiments, the database 36 is implemented on a computing device separate from the assessment computing device 30, or is itself a computing device with database software. In some embodiments, the database 36 is a cloud database.

In various embodiments, the database 36 securely stores a plurality of student portraits 70 and educational standards 75, where each student portrait 70 includes a variety of information about the student that is used for teaching, administrative, record keeping, and/or disciplinary uses. In some embodiments, each student portrait 70 includes profile information 72, learning objectives 73, documents 74, personal learning plans 76, and playlists 78 each including one or more digital cards 68 for an associated student.

In some such embodiments, once in the database 36, data is processed by the assessment computing device 30 using a publisher-subscriber pattern, which allows real time workers to respond to any notifications with real time requirements, where real time notification latency is bounded and monitored. In some embodiments, a distributed compute engine of the assessment computing device 30 runs scheduled asynchronous parallel processes to post-process data in the database 36. In some embodiments, data access is authenticated and logged at the API level, and audited layers of security are maintained. In some embodiments, the database 36 is monitored by a publisher-subscriber system running on the assessment computing device 30 that immediately notifies real time workers when changes to the database 36 are detected. In some embodiments, distributed real time workers support applications with real time requirements such as help requests from students. In some embodiments, a distributed compute engine running on the assessment computing device 30 is flexible and scales asynchronous parallel processes on a schedule to post-process data in the database 36.

In various embodiments, the input/output device 38 include wired or wireless communications interfaces such as jacks, antennas, transmitters, receivers, transceivers, wire terminals, or the like, for conducting data communications with other external systems or devices. In various embodiments, communications via the input/output device 38 may be direct, such as local wired or wireless communications, or via the network 40. For example, the input/output device 38 may include an Ethernet card and port for sending and receiving data via an Ethernet-based communications link or network. In another example, the input/output device 38 may include a wireless transceiver for communicating via a wireless communications network. In another example, the input/output device 38 may include cellular or mobile phone communications transceivers.

In various embodiments, the processor 32 includes one or more microprocessors, application specific integrated circuits (ASICs), one or more field programmable gate arrays (FPGAs), circuits containing one or more processing components, a group of distributed processing components, circuitry for supporting a microprocessor, or other hardware configured for processing. In various embodiments, processor 32 is configured to execute computer code stored in the memory 34 to complete and facilitate the activities described herein.

In various embodiments, the memory 34 is any volatile or non-volatile computer-readable storage medium such as RAM, ROM, flash memory, hard disk storage, flash memory storage, a combination of any of those types of memory, or the like, for storing data and/or computer code for completing and/or facilitating the various user or client processes, layers, and modules described in the present disclosure. In some embodiments, the memory 34 includes or stores database components, object code components, script components, or any other type of information structures for supporting the various activities and information structures of the present disclosure. In various embodiments, the memory 34 is communicably connected to the processor 32 and includes computer code or instruction modules executable by the processor 32 for one or more processes described herein. For example, the memory 34 is shown to include modules in accordance with an embodiment, which are computer code modules such as executable code, object code, source code, script code, machine code, and/or the like, configured for execution by the processor 32. According to an exemplary embodiment, the memory 34 includes a class capture tool module 50, a label generation module 52, a recording device module 54, a card generation module 56, a learning objective module 57, a score normalization module 58, a score weighting module 60, a proficiency analysis module 62, a progression generation module 64, and a group management module 66.

With reference to FIGS. 1 and 3, in various embodiments the assessment computing device 30 is configured to execute the class capture tool module 50 to receive an input from the class capture tool 16. For example, in various embodiments the assessment computing device 30 is configured with the class capture tool module 50 to receive image data from the class capture tool 16 of the image capture device 18. In some embodiments, the class capture tool module 50 is configured to cause the processor 32 to format the image data for inclusion in a digital card for a student, such as by converting image file sizes and/or resolutions, generating thumbnail files, or the like for inclusion of the image data in the digital card.

In various embodiments, the assessment computing device 30 is configured to execute the label generation module 52 to receive an input from the computing device 23 and/or the printer 26 and output data to the computing device 23 and/or the printer 26 for creation of the label 22. In some embodiments, an individual initiates the printing of the label 22 with the computing device 23, such as computer, tablet, or the like, that is configured to communicate with the printer 26, such as by clicking on a "Print" button. In some embodiments, the computing device 23 send a label request to the assessment computing device 30 and the assessment computing device 30 is configured to execute the label generation module 52 to receive from the computing device 23 information related to an assignment such the student's name, the assignment, and/or the like. The information may be manually entered into the computing device 23 by an individual, such as a student or teacher, or may be partially or entirely automatically generated by the computing device 23 and/or the assessment computing device 30. For example, in some embodiments, the student's name is determined by the computing device 23 and/or the assessment computing device 30 based on biometric data, such as facial recognition software, a fingerprint scanner, or the like, and the assignment information is determined using a lesson plan generated by the teacher.

In various embodiments, the label generation module 52 is executed by the processor 32 to generate the machine-readable code 24 for the label 22. In some embodiments, the machine-readable code 24 includes encoded data, such as a student's name, assignment name, student group identification, address of an associated digital card, and/or the like. In various embodiments, the label generation module 52 is executed by the processor 32 to generate the label data for transmission to the computing device 23 and/or the printer 26. According to one example embodiment, the label is generated by the assessment computing device 30 as a Portable Document Format (PDF) file with a width of 3.2 inches and a height of 1.125 inches, and the PDF file is transmitted from the assessment computing device 30 to the computing device 23 and/or the printer 26 for printing. In some embodiments, the computing device 23 from which a print command is generated includes an API call to instruct the label generation module 52 executed by the assessment computing device 30 to transmit the label data to the printer 26. In another embodiment, the printer 26 is configured as the default printer for the corresponding student such that printing data is automatically transmitted to the printer 26 for the student by the assessment computing device 30.

In various embodiments, the assessment computing device 30 is configured to execute the recording device module 54 to receive recorded data from the one or more recording devices 28 disposed in the learning environment 12 and to process or format the recoded data for further use. In some embodiments, the recording device module 54 is configured to cause the processor 32 of the assessment computing device 30 to format a video file, an audio file, or other information for output to a user device or storage device. For example, the recording device module 54 as executed by the processor 32 may cause the processor 32 to format a video file for playback on a computer, may generate a report providing detailed behavior information, or the like. In some embodiments, the assessment computing device 30 is configured to execute the recording device module 54 to cause the processor 32 to perform facial recognition for a video in order to identify people in the video. In some embodiments, the assessment computing device 30 is configured to execute the recording device module 54 to track how often a problem behavior occurs, to track good student behavior, or the like. In some embodiments, the assessment computing device 30 is configured to execute the recording device module 54 to receive input from the trigger device 29 and to format a video file or audio file to create a flag or bookmark at a time in the file corresponding to the time of receiving the input from the trigger device 29.

In various embodiments, the assessment computing device 30 is configured to execute the card generation module 56 to receive activity data from various external devices, such as the image capture device 18, the one or more recording devices 28, the user computing device 42, the one or more third party source computing devices 44, or the like, as well as personal information about the student from the database 36 to populate one or more existing digital cards or to generate one or more new digital cards for storage. In some embodiments, the assessment computing device 30 is configured to execute the card generation module 56 to generate the one or more digital cards 68 or append to existing cards, which are collected and stored in one or more playlists 78 in the database 36. As described in more detail below, the one or more digital cards 68 may each correspond to a learning activity or assignment. In some embodiments, the assessment computing device 30 is configured to execute the card generation module 56 to tag one or more of the digital cards 68 with one or more standards, such as Common Core, Next Generation Science, state standard sets, International Baccalaureate standards, custom standard sets, or the like, applicable to the learning activity associated with the digital card.

In various embodiments, the assessment computing device 30 is configured to execute the learning objectives module 57 to receive personal data about the student, such as previously assigned assessments, and to facilitate the generation of learning objectives. In various embodiments, a learning objective is any learning target for a student. In some embodiments, the learning objective includes subdivisions, such as milestones, sub-milestones, standards, and/or the like. In some embodiments, standards are the most granular learning objective that may be part of a third party standard set, such as Common Core, Next Generation Science Standards (NGSS), Early Learning, or the like. In some embodiments, one or more standards may be mapped to a sub-milestone and one or more sub-milestones may be mapped to a milestone. In various embodiments, the assessment computing device 30 is configured to execute the learning objective module 57 to generate the one or more learning objectives 73 based on one or more standards, sub-milestones, and/or milestones.

In various embodiments, the assessment computing device 30 is configured to execute the score normalization module 58 to convert disparate assessment scales from different sources to a single, common assessment scale to allow for the assessment computing device 30 to aggregate and compare assessments from different sources and to determine if a student has mastered a given standard. In some embodiments, the assessment computing device 30 is configured to execute the score normalization module 58 to convert all assessment scores received from all sources to a 5-point scale by matching the rubrics for the different levels in the 5-point scale. For example, the first level may correspond to the student being exposed to the subject matter, the second level may correspond to the student demonstrating an emerging understanding of the subject matter, the third level may correspond to the student practicing the subject matter, the fourth level may correspond to the student meeting requirements for mastery of the subject matter, and the fifth level may correspond to the student exceeding requirements for mastery of the subject matter. In some embodiments, the first level represents a 20% competency, the second level represents a 40% competency, the third level represents a 60% competency, the fourth level represents 80% competency, and the fifth level represents 100% competency. In various embodiments, the assessment computing device 30 is configured to convert scores from one scale into another scale. For example, in some embodiments the assessment computing device 30 is configured to convert scores from a 1-7 scale, a 1-50 scale, or an A-F scale, to a 1-5 scale. By converting assessments from different assessment sources with different assessment scales to a common scale, the assessments are able to be compared and/or combined to create an overall assessment for a student.

In various embodiments, the assessment computing device 30 is configured to execute the score weighting module 60 to weight the scores from various assessment sources based on a perceived reliability and/or importance of the assessment source. In some embodiments, the assessment computing device 30 is configured to execute the score weighting module 60 to assign a weight to each of the one or more digital cards 68. In some embodiments, the assessment computing device 30 is configured to weight a teacher's assessment more heavily than an assessment from a third party source or a student's assessment. In some embodiments, the assessment computing device 30 is configured such that when an assessment from a third party source has been determined to be more accurate and consistent over time, such as being similar to a consensus of many sources, then assessments from that third party source are weighted more heavily than assessments from another third party source that has been determined to be less accurate and consistent in its assessments over time.

In some embodiments, the assessment computing device 30 is configured to weight a more recent score more heavily than an older score, so as to better indicate a progression in mastery of subject matter by a student. In some embodiments, the assessment computing device 30 is configured to weight more heavily summative assessments than formative assessments. For example, a formative assessment may be given a normal weight while a summative assessment may be given a high weight when calculating a resulting competency score. In some embodiments, progression assessments taking into account multiple scores are considered to be summative assessments while assessments on digital cards for individual activities or assignments are considered to be formative assessments. In various embodiments, the assessment computing device 30 is configured to combine weighted normalized scores from multiple different sources to calculate a resulting competency score.

In various embodiments, the assessment computing device 30 is configured to execute the proficiency analysis module 62 to determine a student's mastery of one or more of the particular standards 75, such as a Common Core Standard, Next Generation Science Standard, state standard sets, International Baccalaureate standards, custom standard sets, or the like, milestone, or sub-milestone. In some embodiments, the assessment computing device 30 is configured to execute the proficiency analysis module 62 to receive normalized scores from the database 36, and to determine an aggregated score for a standard by aggregating scores for all of the one or more digital cards 68 tagged with the standard, and to use the aggregated score to determine a level of proficiency of the student for the standard. In some embodiments, the one or more standards 75 are grouped together in milestones and sub-milestones, as discussed in more detail below.

In various embodiments, the assessment computing device 30 is configured to execute the progression generation module 64 to use a grade level equivalence progression within existing standard sets to understand and track student performance. In some embodiment, the assessment computing device 30 is configured to execute the progression generation module 64 to arrange the proficiency levels for the standards 75 by education level, such as grade level, program level, or the like, and/or by domain.

In various embodiments, the assessment computing device 30 is configured to execute the group management module 66 to suggest personalized work, activities, and/or goals for a given student as well as to do smart groupings of students and otherwise make personalized recommendations. In some embodiments, the assessment computing device 30 is configured to execute the group management module 66 to create a group of students based on the progression of each student as measured by the assessment scores, and based on a grouping strategy. For example, in some embodiments, the assessment computing device 30 is configured to generate an output to identify a group that includes students with a similar proficiency in a particular standard. In another example embodiment, the assessment computing device 30 is configured to generate an output to identify a group including one or more students with advanced proficiency in a particular standard and good peer leadership skills as well as one or more students with a lower proficiency that could benefit from tutoring by the one or more stronger students. The identified group may then be put together for studying one or more subjects for the particular standard.

According to some embodiments, the assessment computing device 30 is formed by a collection of processing devices, such as servers, data centers, or the like. In some such cases, the processor 32 represents the collective processors of the processing devices and the memory 34 represents the collective storage devices of the processing devices. In various embodiments, when one or more programs are executed by the processor 32, the assessment computing device 30 is configured to complete the activities described herein as associated with the system 10. Various screens for a user interface 80 in accordance with various embodiments are described below with reference to FIGS. 4, 5A, 6, 7A, 7B, 8, 9, 10, 11, 13, 14, 15, and 16. In various embodiments, the assessment computing device 30 is configured to provide the various screens of the user interface 80, such as by generating the screens and transmitting the information for the screens over the network 40 for display on one or more computing devices, and to receive, process, and store inputs provided through the screens of the user interface 80.

Figure 4:
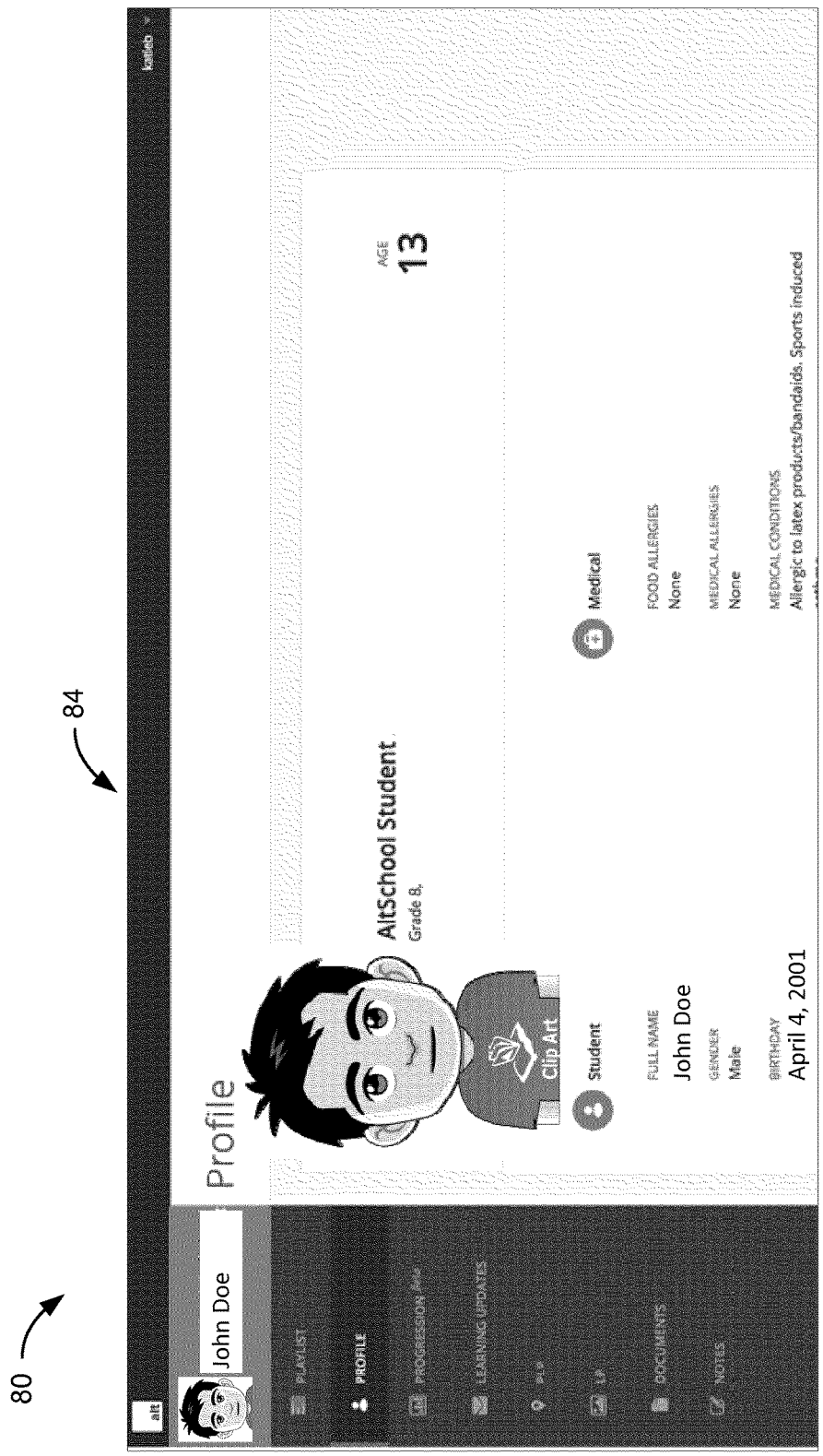
FIG. 4 shows a profile screen of a user interface according to an exemplary embodiment.

Referring now to FIG. 4, a profile screen 84 of a user interface 80 is shown according to an exemplary embodiment. With reference to FIGS. 1, 3, and 4, in an various embodiments the assessment computing device 30 is configured to generate and serve the user interface 80 as a collection of web pages that are accessible to a teacher, parent, guardian, student, or any other authorized user over the network 40. In some embodiments, the user interface 80 is supplied by the assessment computing device 30 as is viewable by a program or application that is executed on a computing device, such as a personal computer, tablet, smartphone, or the like, and may be accessible for viewing on the computing device 23, the user computing device 42, the assessment computing device 30 or any other device that is able to connect and download the information.

In various embodiments, the type and scope of the information provided in the user interface 80 to a user may vary depending on the type of user. For example, a teacher may be given more information and administrative tools in the user interface 80 than a parent or guardian, who, in turn, may be given more information and administrative tools than a student. In some exemplary embodiments, the user interface 80 includes a menu 82 with a multitude of links to allow the user to navigate the user interface 80. The menu 82 may be context specific such that the links displayed in the menu 82 change depending on the portion of the user interface 80 being utilized by the user.

In some embodiments, the profile screen 84 is accessible through the menu 82. In various embodiments, the profile screen 84 displays basic information about the student, including, but not limited to, a photograph of the student, name, age, gender, birthday, grade level, medical information, such as allergies, medications, medical conditions, and/or the like, and contact information, such as guardian contact information, authorized pick-up individuals, emergency contacts, and/or the like. In some embodiments, the assessment computing device 30 is configured to retrieve the information displayed on the profile screen 84 from the profile information 72 stored in the database 36, and to format the information for display. Additional information for the student may be accessible in a documents section. In some embodiments, the documents section is accessible by clicking on a documents link in the menu 82. In some embodiments, the documents section includes documents collected during the admission process, such as transcripts, as well as documents created by or for the student. In some embodiments, the assessment computing device 30 is configured to retrieve the documents from the documents 74 stored in the database 36 and to format the documents for display. In some embodiments, the documents are stored on a cloud storage folder. The cloud storage folder may be accessible by a user, such as a parent, guardian, student, or the like, to allow the user to manually upload new documents and to view or edit existing documents depending on access authorizations. In various embodiments, the menu 82 further includes links to access a Progression screen for the student, a learning updates screen, and a Personal Learning Plan (PLP) screen for the student.

Figure 5A:
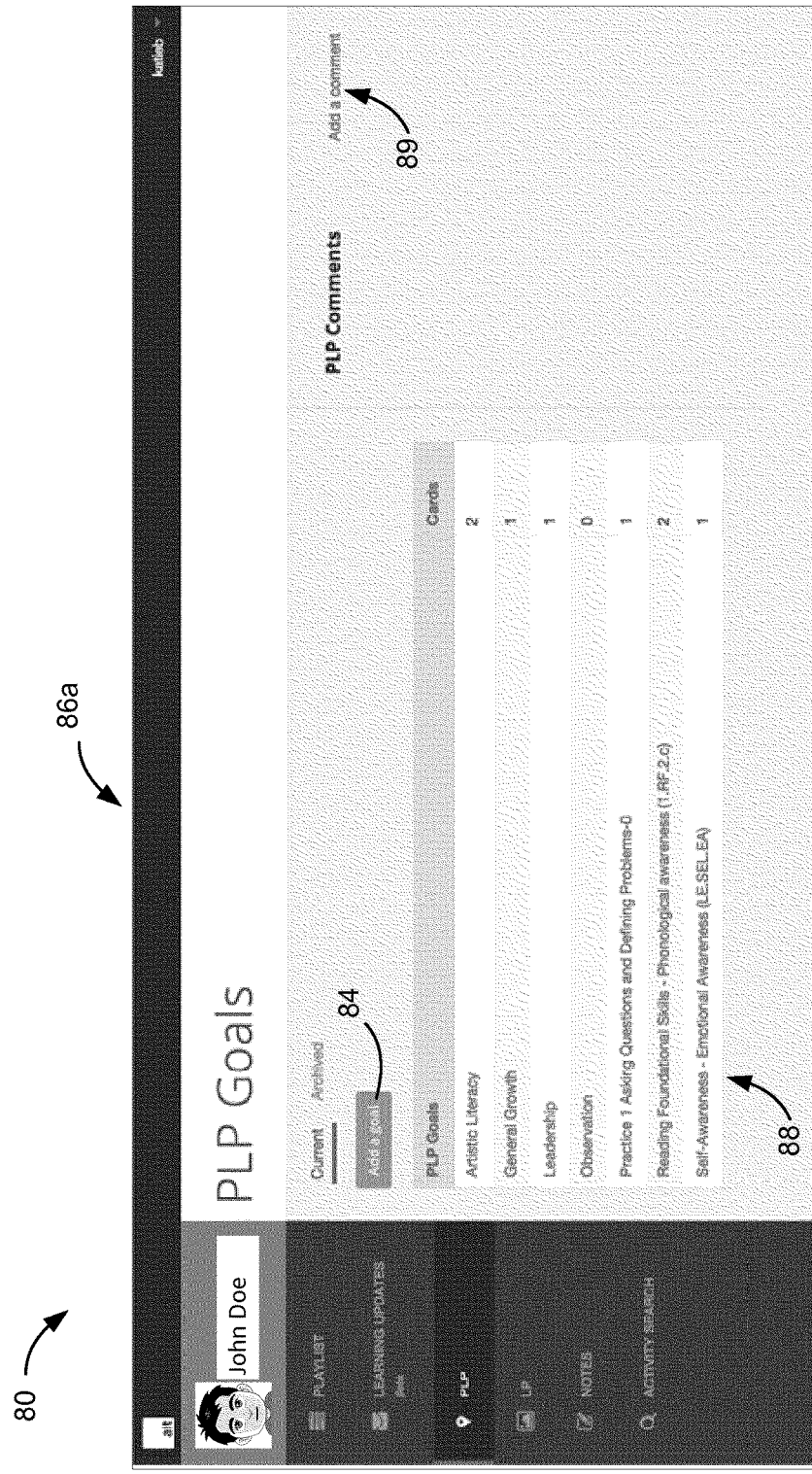
FIG. 5A shows a goals screen of a user interface according to an exemplary embodiment.
Figure 5B:
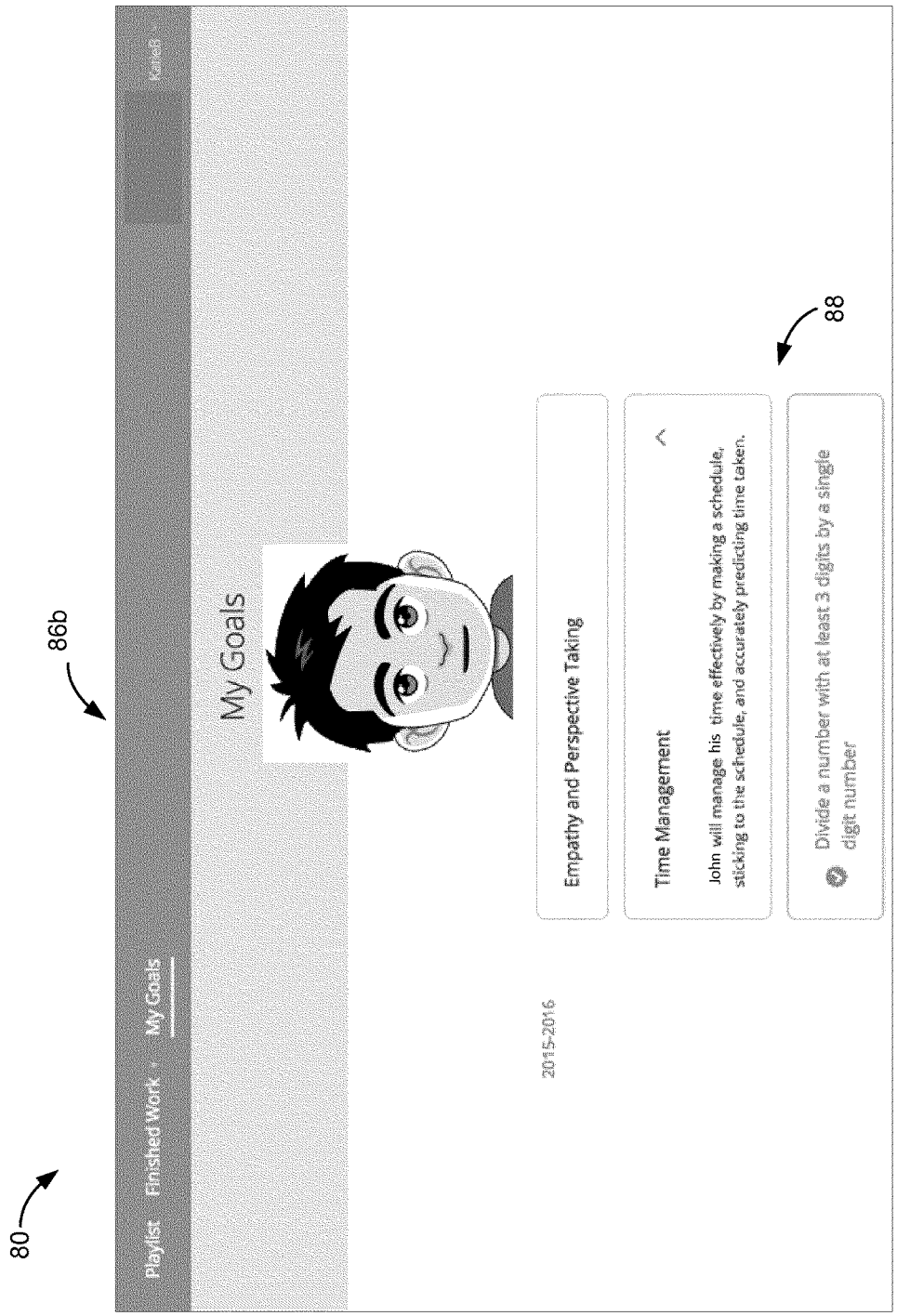
FIG. 5B shows a goals screen of a user interface according to another exemplary embodiment.

FIG. 5A shows a Personal Learning Plan (PLP) goals screen 86a of the user interface 80 according to an exemplary embodiment. FIG. 5B shows a goals screen 86b of the user interface 80 according to another exemplary embodiment. With reference to FIGS. 1, 3, 5A, and 5B, in some embodiments the goals screens 86a, 86b are accessible through the menu 82. The goals screens 86a, 86b display learning objectives 88 assigned to the corresponding student. In some embodiments, the assessment computing device 30 is configured to vary the goals screen presented to the user based on the identity of the user. For example, in various embodiments the assessment computing device 30 is configured to present a teacher with a first goals screen 86a (FIG. 5A) and to present a student with a second goals screen 86b (FIG. 5B) with different and/or fewer options than the first goals screen 86a.

In some embodiments, the assessment computing device 30 is configured to prioritize the learning objectives 88 that are displayed based on a personal learning plan of the student. In some embodiments, the assessment computing device 30 is configured to generate the goal screen 86a to display the number of digital cards associated with each of the goals in the section of the learning objectives 88. In some embodiments, the assessment computing device 30 is configured to generate the goals screen 86a to include a comment link 89, which allows a user to add a comment concerning the learning objectives 88. In some embodiments, the assessment computing device 30 is configured to retrieve the information displayed on the goals screen 86a from the personal learning plans 76 stored in the database 36. In various embodiments, the goals screen 86a includes an add a goal button 84 that can be clicked to allow a user to add additional goals to the learning objectives 88. In some embodiments, the learning objectives 88 from the student's personal learning plan determine digital cards that populate a playlist for the student. In some embodiments, the assessment computing device 30 is configured to automatically suggest the goals for the learning objectives 88 based on weaknesses and strengths of the student as determined from assessments of the student. In some embodiments, a teacher can create a learning objective that is assigned to multiple students, such as a sub-group, a class, or the like. A learning objective may be set with a target completion date. Once completed, a goal completion may be archived by the assessment computing device 30. In various embodiments, the goals screens 86a, 86b can be configured to show different subsets of goals for a student, including current goals or archived goals.

Figure 6:
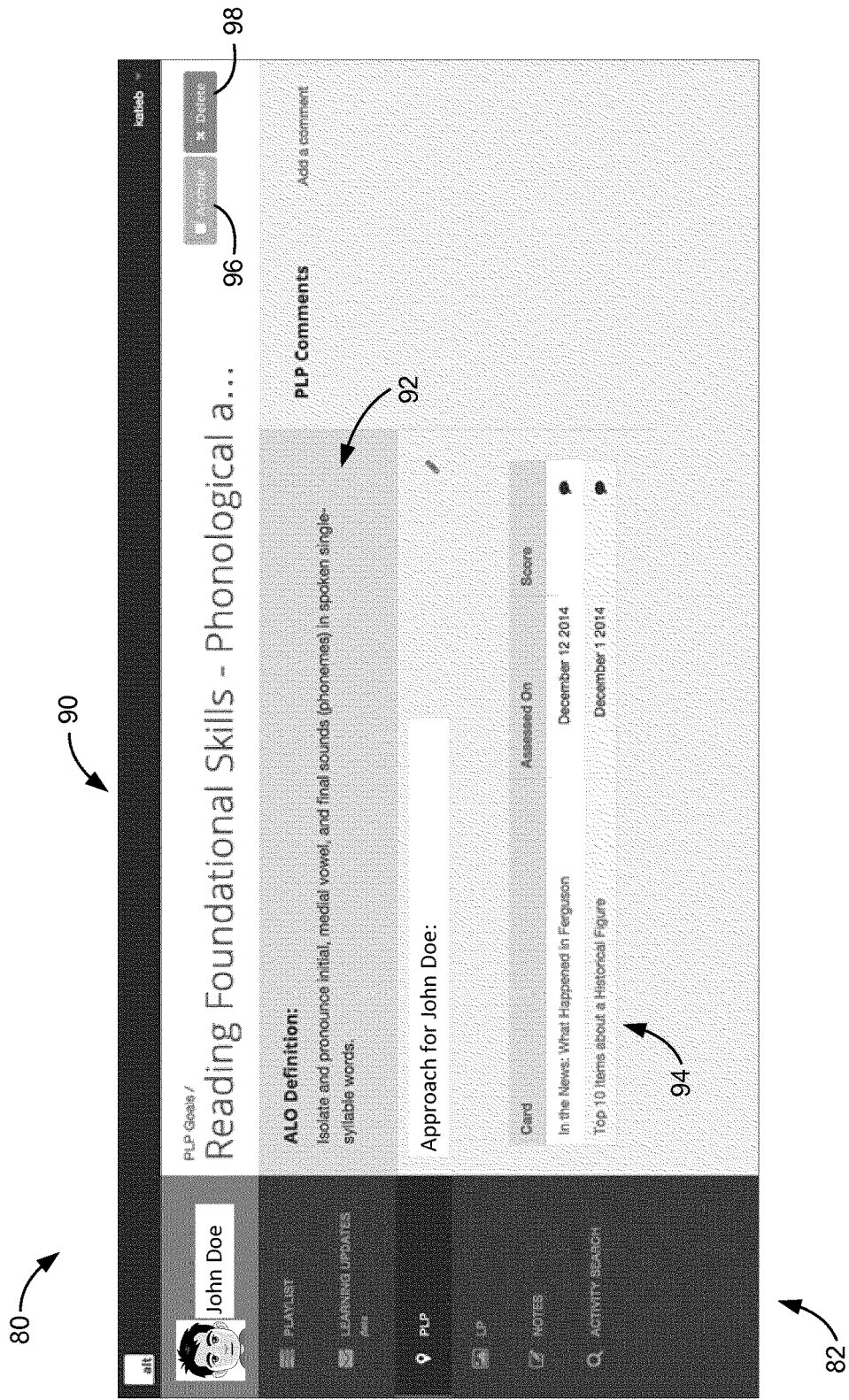
FIG. 6 shows a learning objective screen of a user interface according to an exemplary embodiment.

Referring now to FIG. 6, a learning objective screen 90 of the user interface 80 is shown according to an exemplary embodiment. With reference to FIGS. 1, 3, 5A, and 6, in some embodiments, the learning objective screen 90 is accessible by clicking a link in the learning objectives 88 section of the goals screen 86a. In various embodiments, the assessment computing device 30 is configured to generate the learning objective screen 90 to display information related to a specific learning objective for the corresponding student. In some embodiments, the assessment computing device 30 is configured to generate the learning objective screen 90 to include a description 92 of the corresponding learning objective and individual digital card entries 94 that correspond to the learning objective. In various embodiments, the individual digital card entries 94 include information such as the name of the digital card, the date of the last assessment for the digital card, and an assessed score for the project or assignment associated with the digital card. In various embodiments, some or all of the information or options on the learning objective screen 90 may be hidden based on the permission level of the user. For example, in some embodiments the assessment computing device 30 is configured to generate the learning objective screen 90 such that a user with administrative privileges, such as a teacher, is presented with an archive button 96 and a delete button 98 allowing the user to archive and remove the selected learning objective from the goals screen 86*a* or delete the selected learning objective, respectively.

Figure 7A:
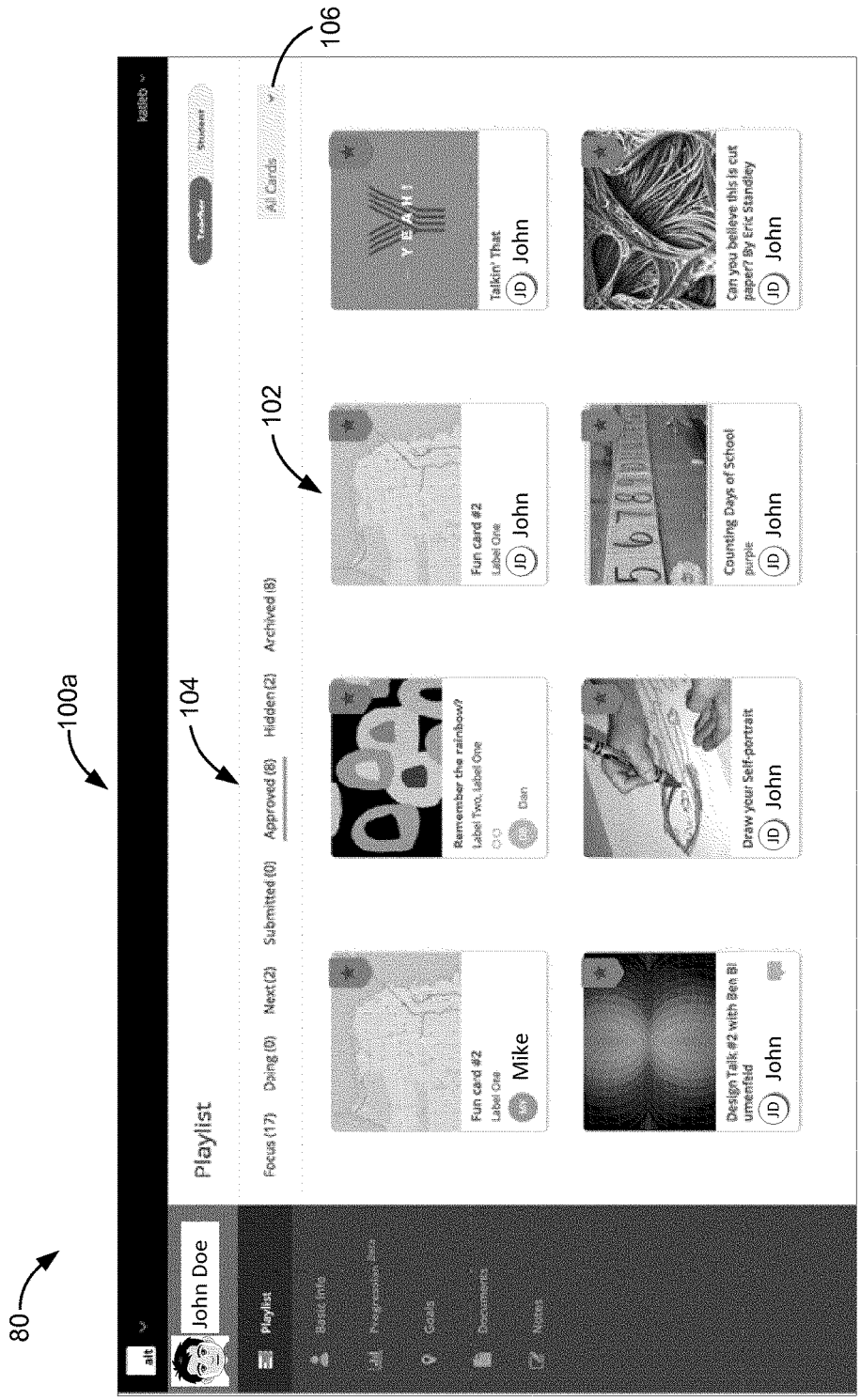
FIG. 7A shows a playlist screen of a user interface according to an exemplary embodiment.
Figure 7B:
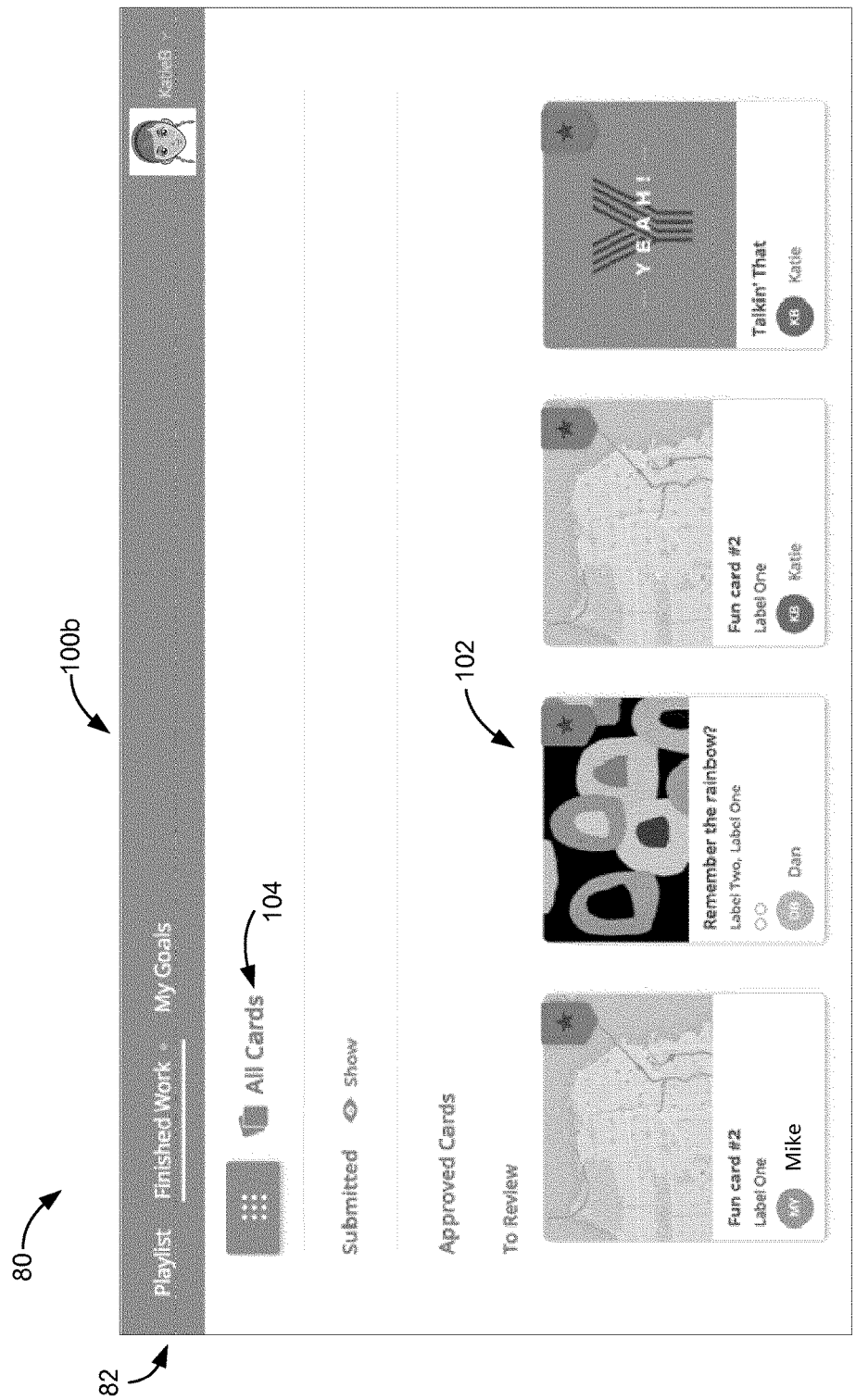
FIG. 7B shows a playlist screen of a user interface according to another exemplary embodiment.

FIG. 7A shows a playlist screen 100*a* of the user interface 80 according to an exemplary embodiment. FIG. 7B shows a playlist screen 100*b* of the user interface 80 according to an exemplary embodiment. With reference to FIGS. 1, 3, 7A, and 7B, in some embodiments the playlist screens 100*a*, 100*b* are accessible through the menu 82. In some embodiments, the playlist screen presented to the user varies based on the identity of the user. For example, in various embodiments the assessment computing device 30 is configured to present a teacher a first playlist screen, such as the playlist screen 100*a*, and to present a student with a second playlist screen, such as the playlist screen 100*b*, with different and/or fewer options than the first playlist screen.

The playlist screens 100*a*, 100*b* display for the user one or more digital cards 102, each corresponding to a learning activity or assignment. In some embodiments, the playlist screen 100*a* displayed to a teacher displays digital cards 102 for multiple students. In some embodiments, the assessment computing device 30 is configured to generate the playlist screen 100*a* to include filter options 104 to allow the user to sort the digital cards 102 displayed based on the status or properties of the digital cards 102, such as focus, doing, next, submitted, approved, hidden, archived, and/or other statuses. In various embodiments, a drop down menu 106 provides additional options for the teacher. For example, in some embodiments, the drop down menu 106 allows a teacher to display only digital cards for a particular student or group. In some embodiments, the playlist screen 100*b* presented to a student displays digital cards 102 for that student. In some embodiments, the playlist screen 100*b* presented to a student also displays digital cards 102 for other students to allow for peer review or group work. In various embodiments, the playlist screen 100*b* further displays a more simplified menu 82 and more simplified filter options 104 that for the playlist screen 100*a*. In some embodiments, the playlist screen 100*b* presented to a student is configured to display a limited number of digital cards 102, such as digital cards 102 representing activities to be completed by the student over a one day or one week period. In some embodiments, each of the digital cards 102 in the playlist screens 100*a*, 100*b* are clickable to bring up more information for each of the digital cards 102.

Figure 8:
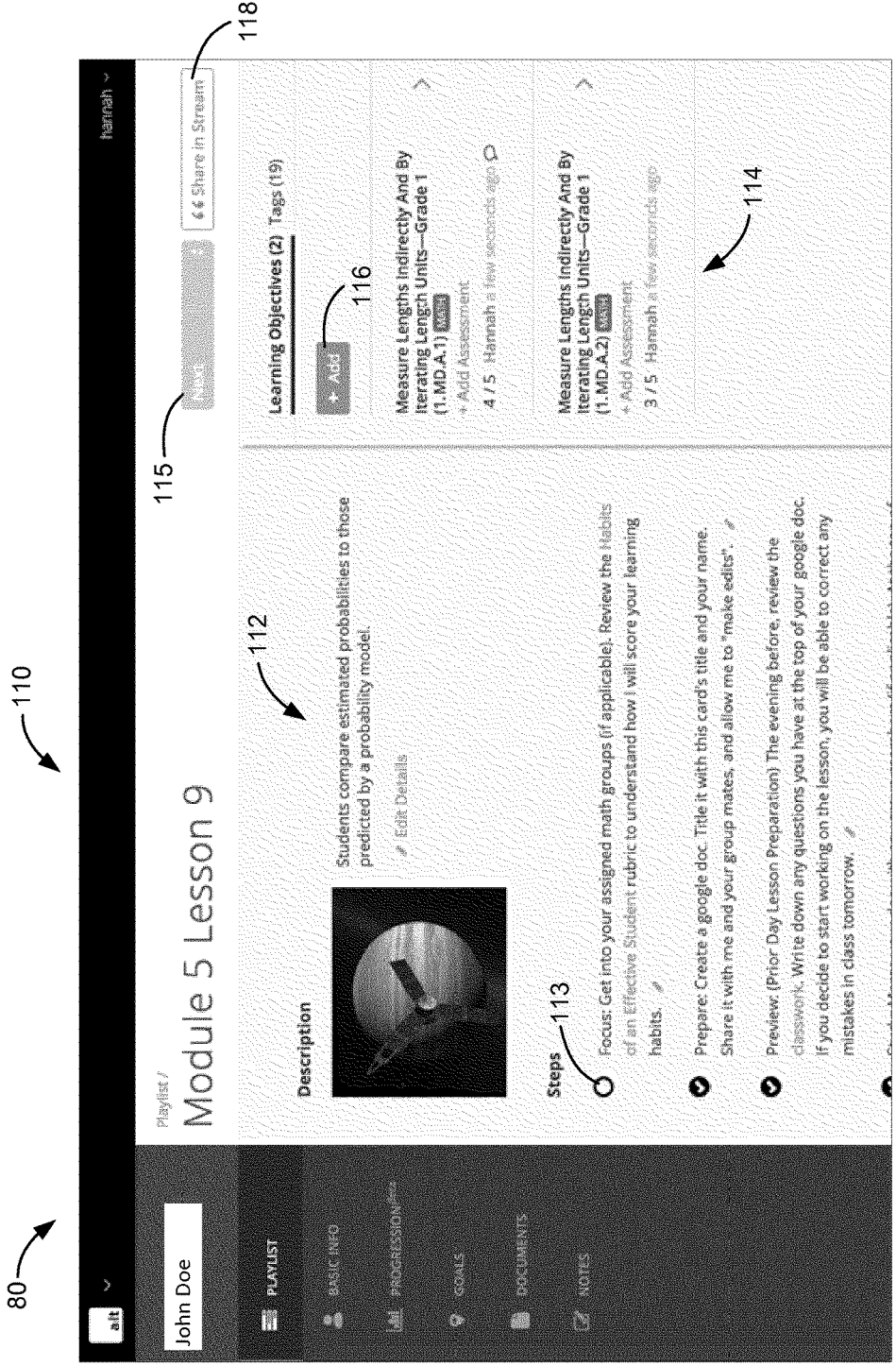
FIG. 8 shows a card screen of a user interface according to an exemplary embodiment.
Figure 9:
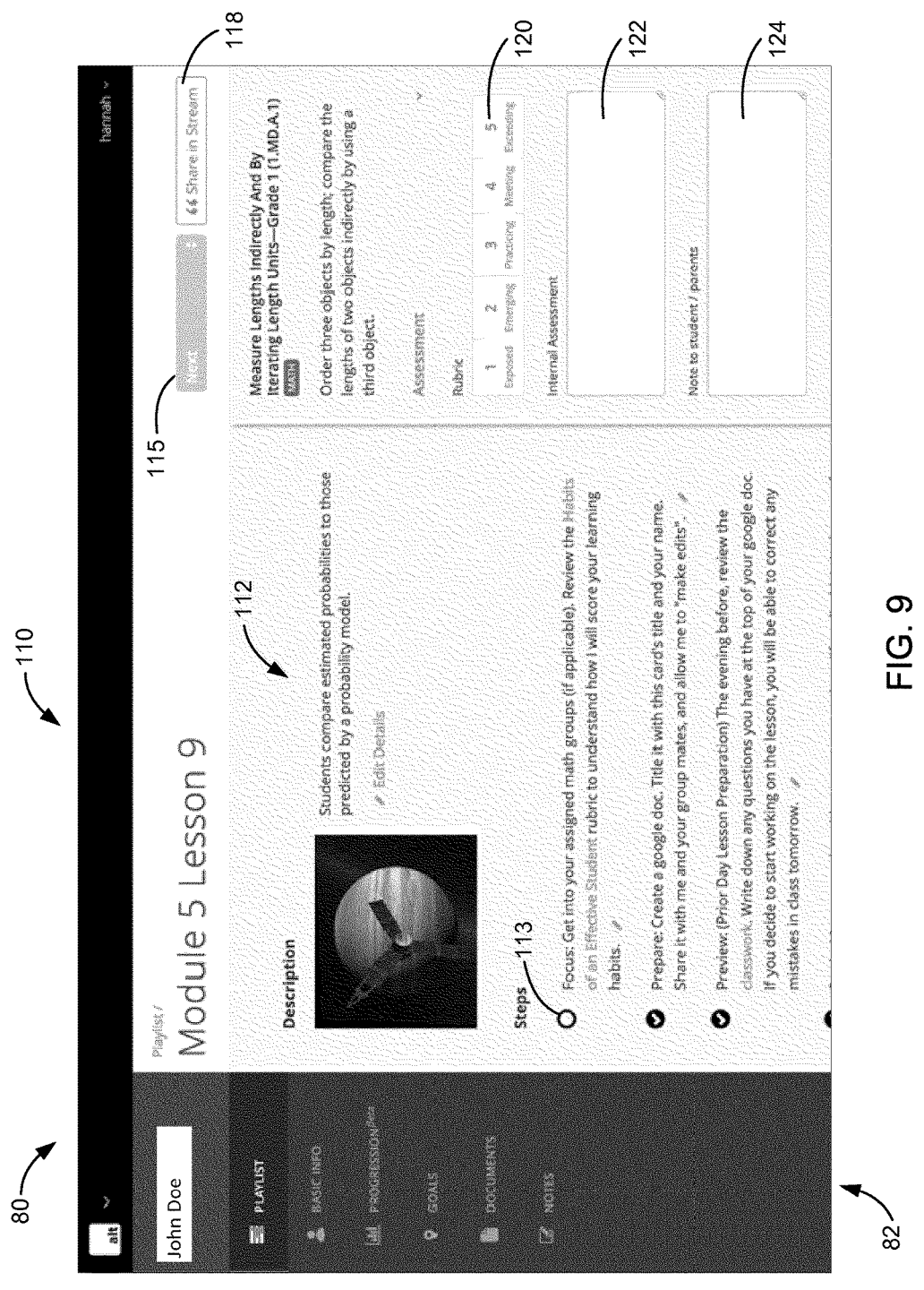

Referring now to FIGS. 8 and 9, a card screen 110 of the user interface 80 is shown according to an exemplary embodiment. In some embodiments, the card screen 110 is accessible through the menu 82. In some embodiments, the card screen 110 is accessible by selecting one of the digital cards 102 on the playlist screen 100*a* (refer to FIG. 7A). With reference to FIGS. 1, 8, and 9, in various embodiments the assessment computing device 30 is configured to generate the card screen 110 to display a description of a learning objective 112 and steps to be completed by a student to achieve the learning objective 112 associated with the corresponding digital card. In various embodiments, the learning objective 112 is a goal that is intended to develop a skill, such as learning a subject, attention and focus, panning, writing, and/or the like. In various embodiments, the steps to be completed for the learning objective 112 provide a personalized approach for the student to achieve the goal. In various embodiments, each step for the learning objective 112 in the card screen 110 may include an indicator 113 to show whether the step has been completed or not. In various embodiments, steps for the learning objective 112 can be added, deleted, or edited by a user with appropriate administrative privileges, such as the teacher that created the learning objective 112. In some embodiments, a teacher can create a master digital card that is assigned to multiple students, such as a sub-group, a class, or the like.

In various embodiments, navigation buttons 115 in the card screen 110 allow a user to navigate between cards. Further, in various embodiments the card screen 110 displays one or more assessments 114. In various embodiments, the assessments 114 may be added to the corresponding digital card by a teacher after submission of the digital card or may be added with the card when it is created. In some embodiments, an add button 116 in the card screen 110 allows additional assessments to be added. Also, in some embodiments, a share button 118 in the card screen 110 allows assessment notes to be shared. For example, a teacher may share assessment notes with a parent or guardian of the student to provide parents with more transparency into what their child is learning, how they are doing, why, and/or the like.

In various embodiments, selecting the add button 116 presents the user with options for assessing the student's work, as shown in FIG. 9. In various embodiments, rubric buttons 120 in the card screen 110 allow a numerical score to be assigned to the work for the corresponding digital card. Also, in various embodiments, an internal assessment field 122 in the card screen 110 allows internal notes and commentary to be added for a corresponding digital card. In some embodiments, the internal assessment field 122 and anything contained therein is visible only to a teacher or other user with proper administrative privileges. In some embodiments, a notes field 124 in the card screen 110 allows notes to be added to the assessment for the corresponding digital card. The notes may be, for example, directed to the student and/or the parent or guardian of the student.

In some embodiments, not all of the one or more digital cards 102 (refer to FIG. 7A) are assessed with a score. In some embodiments, only digital card of the one or more digital cards 102 that are tagged with a learning objective are able to be assessed with a score. Additional digital cards may be provided, for example, to demonstrate interpersonal skills and activities of the student that are not tracked for progression. In some embodiments, the additional digital cards are generated automatically by the assessment computing device 30 based on the performance of the student. For example, digital cards for a third party assessment source may be generated or suggested based on learning gaps in order to determine an ideal level for the student, or to have the student practice particular skills at regular intervals.

Figure 10:
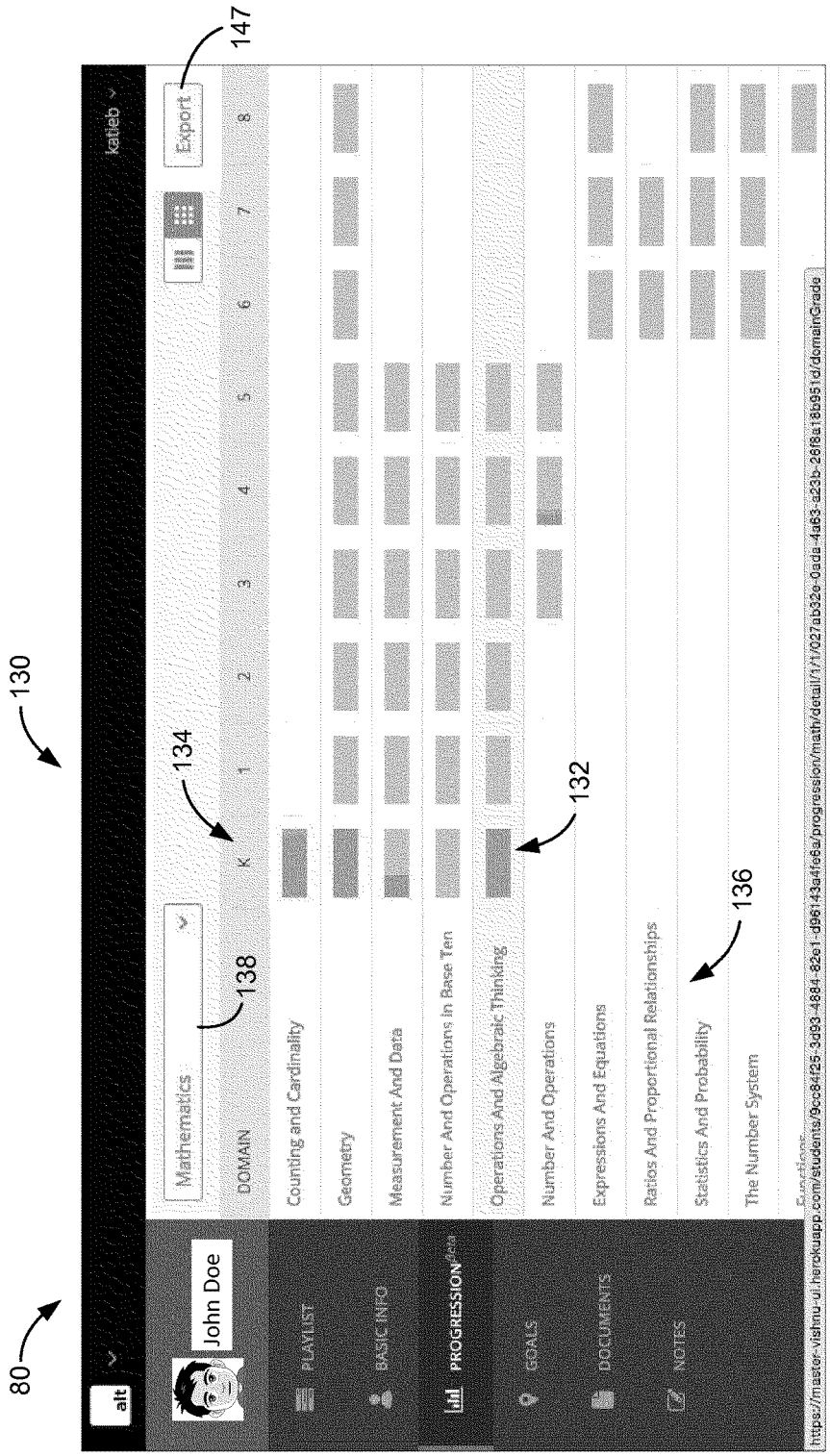
FIG. 10 shows a progression screen of a user interface according to an exemplary embodiment.
Figure 11:
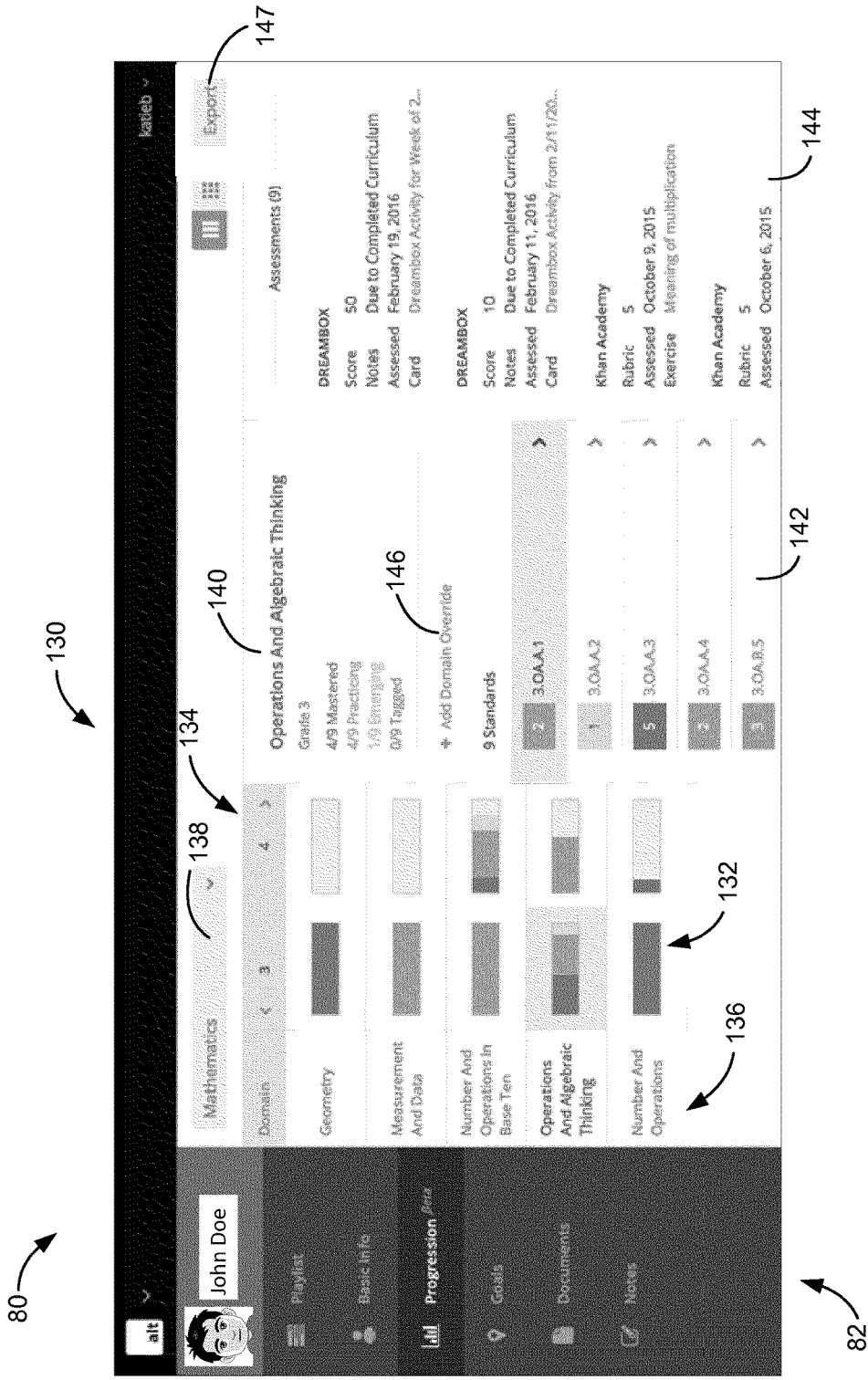
FIG. 11 shows a progression screen of a user interface according to an exemplary embodiment.

Referring now to FIGS. 10 and 11, a progression screen 130 of the user interface 80 is shown according to an exemplary embodiment. In some embodiments, the progression screen 130 is accessible through the menu 82. With reference to FIGS. 1, 10, and 11, in various embodiments the assessment computing device 30 is configured to generate the progression screen 130 to display progress bars 132 indicating a mastery of a student of standards related to the learning objectives assessed in the corresponding digital cards for the student. In various embodiments, the assessment computing device 130 is configured to calculate the information for display in the progress bars 132 based on the assessment data received from the various sources for the corresponding student. In various embodiments, the progression screen 130 allows a user, such as a teacher, parent or guardian, student, or the like, to understand and track student performance, such as by displaying the progress bars 132. In various embodiments, the progression screen 130 presents a visualization that enables educators to understand and track student exposure, competence, and confidence score for standards sets and parents to understand student progress against standard sets.

In various embodiments, the assessment computing device 30 is configured to order the progress bars 132 by education level 134, such as by grade level, program level, or the like, and by domain 136, such as areas of learning within a corresponding subject. In some embodiments, the progress bars 132 include a separate progress bar for each domain and grade level. In some embodiments, the progress bars 132 displayed are filtered by subject, such as a standard set, which can be changed through a subject drop-down menu 138 in the progression screen 130. In various embodiments, the assessment computing device 30 is configured to generate the progression screen 130 to display a map of a exposure and mastery by a student of various standards based on assessments received from various sources for the student, in order to demonstrate a student's learning frontier, gaps, and strengths. In some embodiments, the progress bars 132 use color coding to indicate proficiency. For example, a green color may be used to indicate the student has met or exceeded requirements for mastery of a domain, such as with a calculated score of 4 or 5 from assessments for that domain, and an orange color may be used to indicate that the student has not met requirements for mastery of a domain, such as with a calculated score of 1, 2, or 3 from assessments for that domain. In some embodiments, each proficiency level is indicated with a different color or shade of a color, such as with progressively darker shades of a color as the proficiency increases from 0 to 5 as calculated by the assessment computing device 30 based on assessments received from various sources for a corresponding domain. In some embodiments, proficiency may be otherwise indicated, such as with bar patterns, bar thicknesses, bar darkness/lightness, or the like. In some embodiments, a proficiency level for each domain may be indicated in a different manner than a bar. For example, in some embodiments, the proficiency level may be indicated with a text label, a number, or a pie graph. In some embodiments, the progress bars 132 may indicate uncertainty in the aggregate proficiency score for the domain. Such uncertainty may be due to, for example, limited assessment data or highly variable assessment data. In some embodiments, an uncertain proficiency is indicated with an orange color.

In various embodiments, the assessment computing device 30 is configured such that the selection of an individual progress bar of the progress bars 132 causes the assessment computing device 30 to present the user with more detail of a corresponding domain and education level for a student, including a summary 140 of the student's progress and proficiencies for standards 142 associated with the domain. In various embodiments, the assessment computing device 30 is configured to calculate a score for the student for display for each corresponding standard based on assessments received for the student from various sources. In various embodiments, selecting an individual standard from among the standards 142 presents the user with assessments 144, each corresponding to a digital card tagged with the applicable standard. In various embodiments, selecting an individual assessment from among the assessments 144 presents the user with the corresponding card screen, such as the card screen 110 (refer to FIG. 8), for the digital card associated with the selected assessment. In some embodiments, an override link 146 allows a user to override the mastery score for the domain-level score or the score for an individual standard for the student, such as in a case where a teacher feels that the student should have a different mastery score for a particular standard than has been calculated by the assessment computing device 30.

Figure 12:
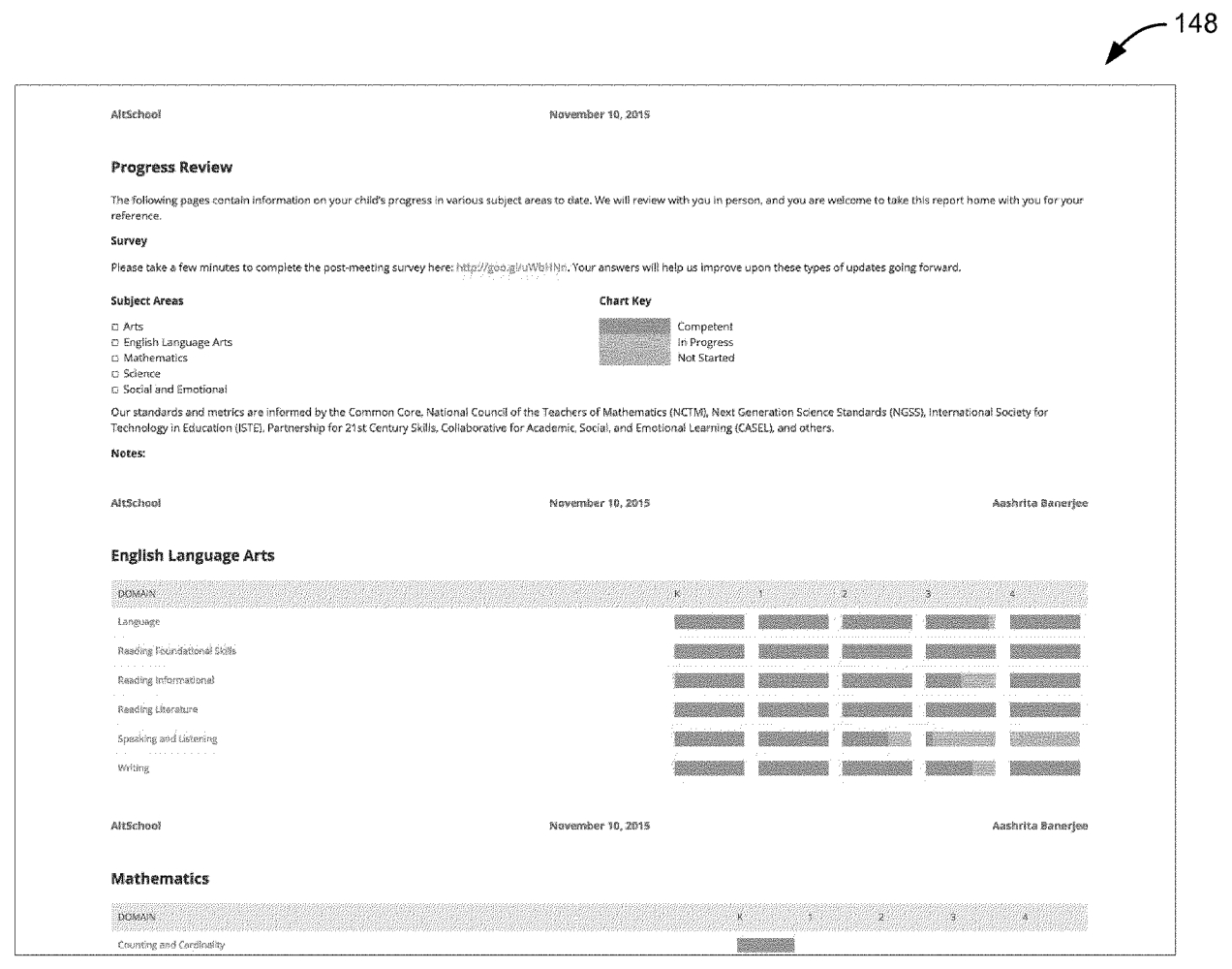

In some embodiments, an export button 147 in the progression screen 130 allows a user to generate a summary report 148 of the progress of the student, as shown in FIG. 12. With reference to FIGS. 1, 11, and 12, in some embodiments the assessment computing device 30 is configured to generate the summary report 148 as a Portable Document Format (PDF) file that includes a cover letter and a key to aid in understanding the progress data presented by the summary report 148. In some embodiments, the summary report 148 includes one or more links to the associated student's page, such as the progression screen 130 in the user interface 80. In various embodiments, the summary report 148 is generate to include progress bars for each domain and grade level to indicate the mastery of a student for that domain at that grade level.

In some embodiments, the progression screen 130 includes an option to display a flattened progression chart. The flattened progression chart displays the competency scores for all students in a chosen group, such as a class, a grade level, or the like, to allow a user to easily ascertain the progression of the group as a whole in various standards. In some embodiments, the progression screen 130 includes a slider bar that allows the user to adjust the scope of the progression chart to include a group of any size, between a large group like an entire school down to a single student.

Figure 13:
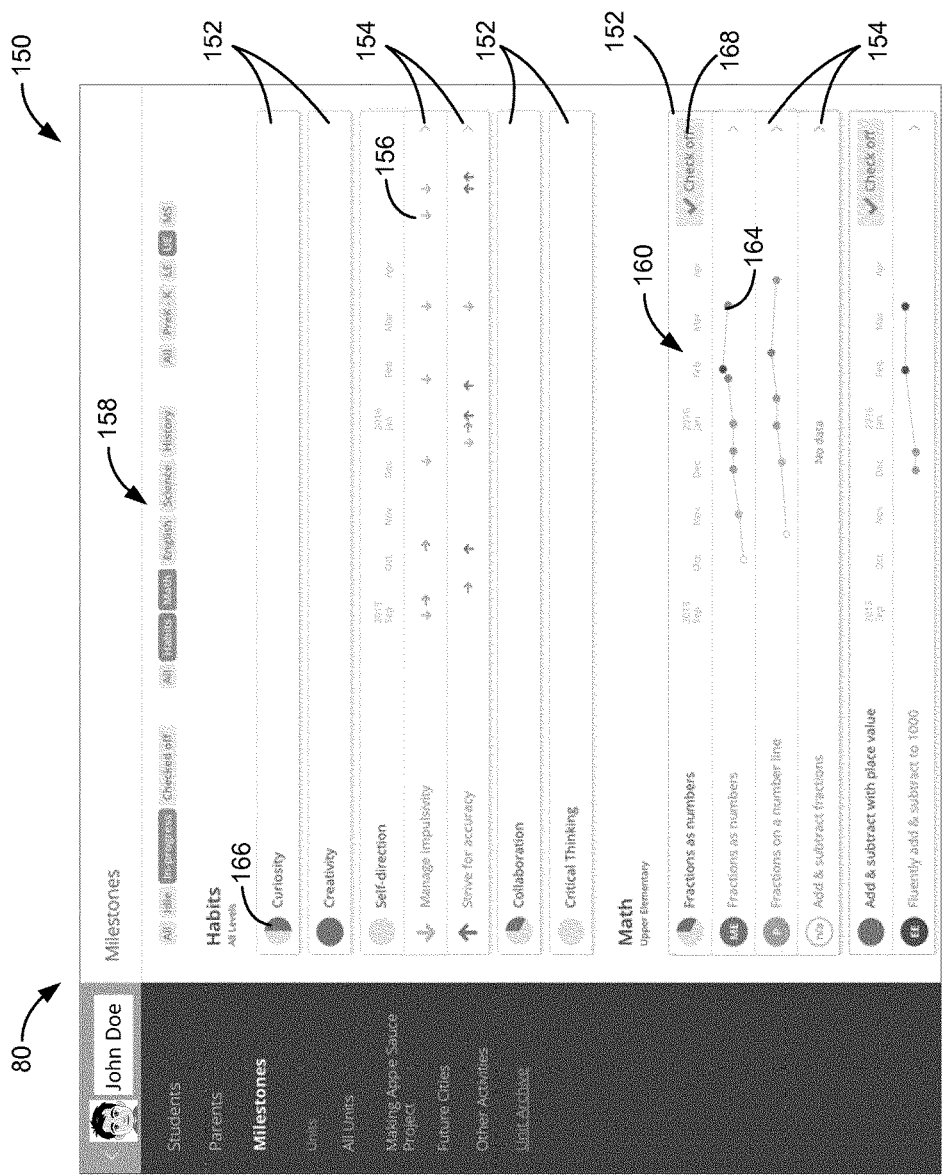
FIG. 13 shows a milestones screen of a user interface according to an exemplary embodiment.

Referring now to FIG. 13, a milestones screen 150 of the user interface 80 is shown according to an exemplary embodiment. In some embodiments, the milestones screen 150 is accessible through the menu 82. With reference to FIGS. 1 and 13, in various embodiments the assessment computing device 30 is configured to generate the milestones screen 150 to display proficiency data for one or more milestones 152, sub-milestones 154, or standards over a period of time. For example, the milestones screen 150 may be configured to show proficiency data over the period of a week, a month, a semester, a year, all time, or the like, for a student. In some embodiments, filter buttons 158 are provided in the milestones screen 150 to allow the user to adjust the scope of the milestones 152 that are displayed on the milestones screen 150 based on, for example, status (e.g., idle, in progress, completed/checked off, etc.), domain, subject, and/or grade level. In some embodiments, trends for the milestones 152 or sub-milestones 154 are shown with trend indicators 156, shown as up-facing arrows to indicate increasing proficiency, down-facing arrows to indicate decreasing proficiency, and side-facing arrows to indicate no change in proficiency. In some embodiments, additional details are displayed when hovering over or selecting a trend indicator from among the trend indicators 156.

In some embodiments, trends for each of the milestones 152 are shown with trend lines 160. In various embodiments, the assessment computing device 30 is configured to provide the data for the trend lines 160 for each of the sub-milestones 154 and/or standards under the milestones 152 to show the contribution of each of the sub-milestones 154 and/or standard to the overall progression for the corresponding milestone. Seeing the contributions of the sub-milestones 154 and/or standards to the progression of the milestones 152 allows a teacher to review and take action if needed, such as setting new goals, planning different activities, assessing progress, and/or the like. In some embodiments, additional details, such as dates, digital card links, individual assessments, and/or the like are displayed when hovering over or selecting an individual data point 164 on any of the trend lines 160. In some embodiments, the user can hide or show the individual data points 164 on the trend lines 160. In some embodiments, a teacher can add a new assessment and a new data point directly to any of the trend lines 160, such as to capture relevant student learning moments for a given learning objective. The new assessment may be appended to an existing digital card, used to create a new digital card, or provided without a digital card. In some embodiments, if the new assessment is provided without a digital card, then a narrative, photo, or other type of evidence may be provided with the assessment. In some embodiments, the milestones screen 150 displays a horizontal time marker extending over some or all of the milestones 152, sub-milestones 154, or standards to allow a user to easily compare progress data across milestones 152.

In some embodiments, a progress indicator 166, shown as a pie graph or other type of graph, is provided in the milestones screen 150 to show a student's progress for a corresponding individual milestone of the milestones 152. In some embodiments, a check off button 168 is provided to allow a teacher to mark a corresponding milestone from among the milestones 152 as completed. In some embodiments, the teacher may un-check the check off button 168 for a corresponding milestone to reactivate the milestone. In some embodiments, a create goal button is provided in the milestones screen 150 to allow a teacher to create a new goal for a student based on an individual milestone or sub-milestone. The new goal may be created with a title based on the milestone or sub-milestone from which it was created, with the user able to change the title to a custom title that more specifically represents a focus for the given student.

With reference to FIGS. 10, 11, and 13, in various embodiments the progression screen 130 and/or the milestones screen 150 are configured to allow a user to view historical data to see how a student's progress has changed over time. For example, in some embodiments, the progression screen 130 and/or the milestones screen 150 include a date selector tool. The date selector tool may be, for example, a drop-down menu or a slider. Upon selecting a date or range of dates with the date selector tool, the user is presented with a snapshot of the proficiency and progression data on that date or range of dates for a corresponding student. In this way, the user can roll back to a desired time, such as the first week of school, the week before a large exam, or the like, to more easily assess a student's progression over time.

Figure 14:
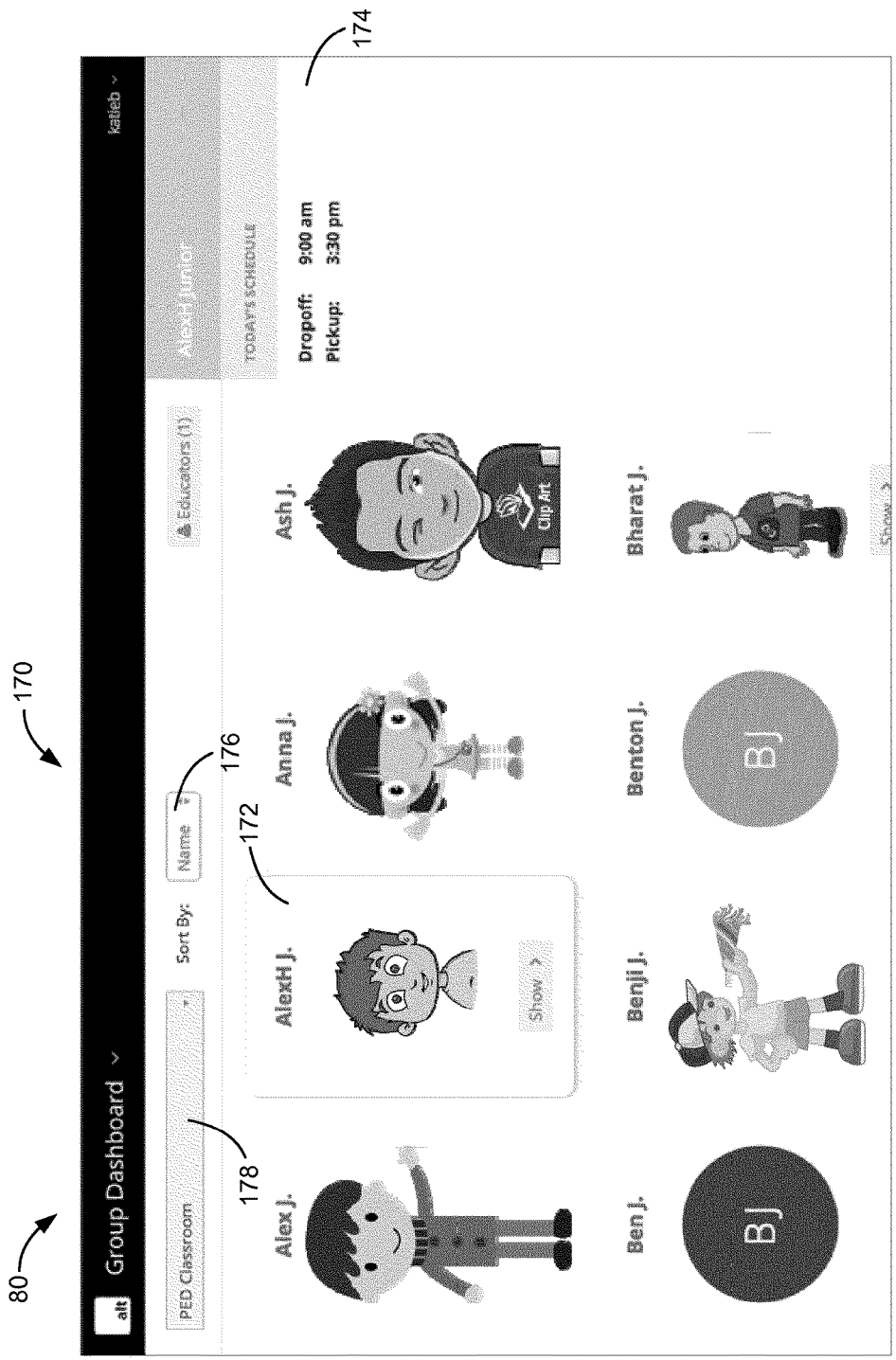
FIG. 14 shows a group dashboard screen of a user interface according to an exemplary embodiment.

Referring now to FIG. 14, a group dashboard screen 170 of the user interface 80 is shown according to an exemplary embodiment. In various embodiments, the group dashboard screen 170 allows a user, such as a teacher, to view a group of students, such as an entire class, a group of students within a class, or a co-curricular group that includes students across multiple classes. In some embodiments, the group dashboard screen 170 displays one or more student photographs 172. In some embodiments, details concerning a student may be displayed in a sidebar 174 when the corresponding student photograph among the student photographs 172 is selected or hovered over. The sidebar 174 may additionally display other alerts, such as a schedule, schedule changes sent by a parent or guardian, or a custom message for the student. In various embodiments, a user may access a particular student's page by clicking on the photograph for the student from among the student photographs 172. In various embodiments, the group of students displayed on the group dashboard screen 170 may be custom selected by the teacher. In some embodiments, the assessment computing device 30 is configured to automatically create or suggest a group that is displayed in the group dashboard screen 170 based on the activities of the students and/or based on assessments for the students as collected from various sources. For example, a group of students may be suggested by the assessment computing device 30 based on a similar progression in a particular domain, such as an area of math, literature, and/or the like. In various embodiments, a drop down menu 176 allows a user to change a sorting of the students in the group dashboard screen 170, such as by first name, last name, assessment scores, or the like. In some embodiments, a drop down menu 178 in the group dashboard screen 170 allows a user to change the group of students displayed on the group dashboard screen 170 to another group.

Figure 15:
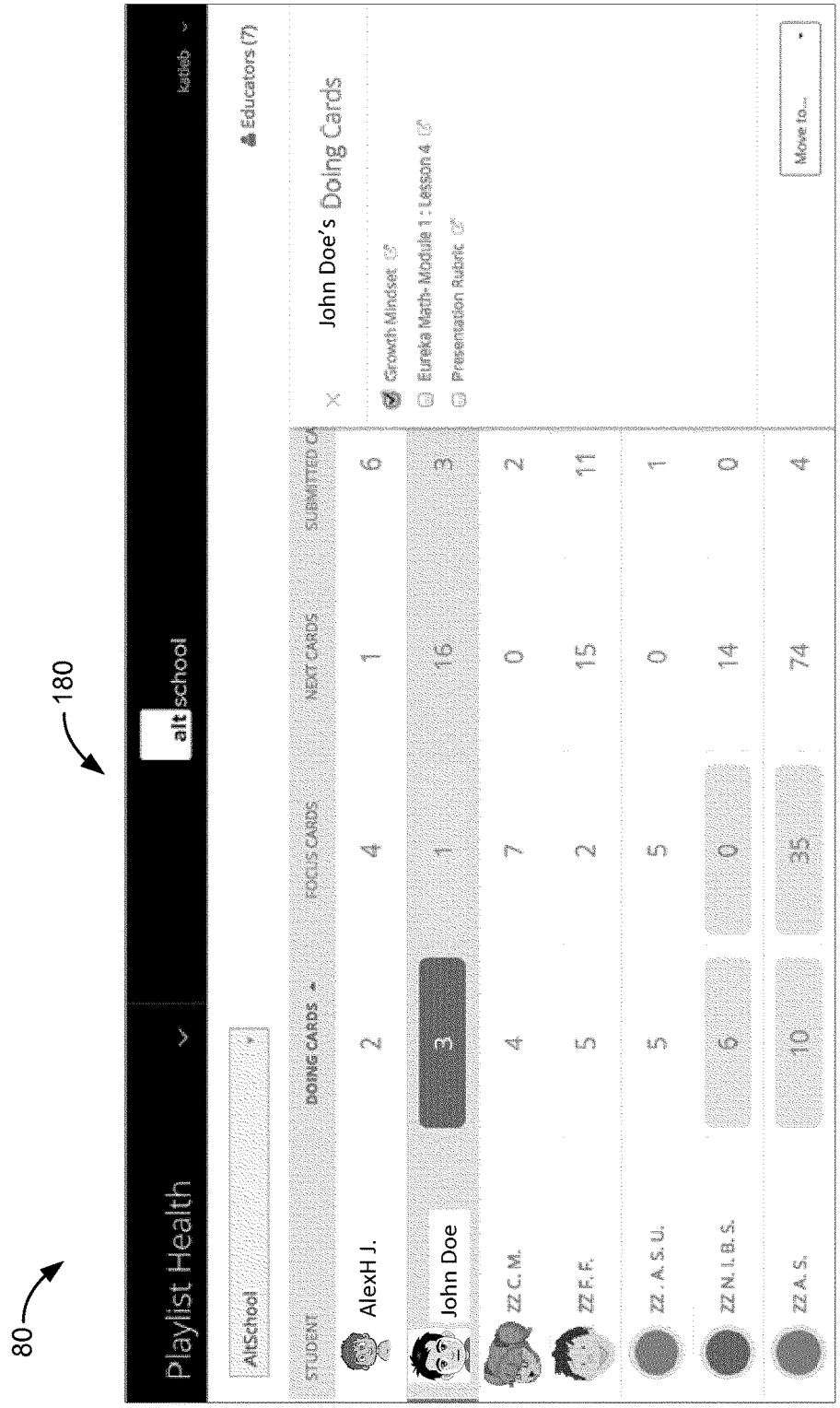
FIG. 15 shows a playlist health screen of a user interface according to an exemplary embodiment.
Figure 16:
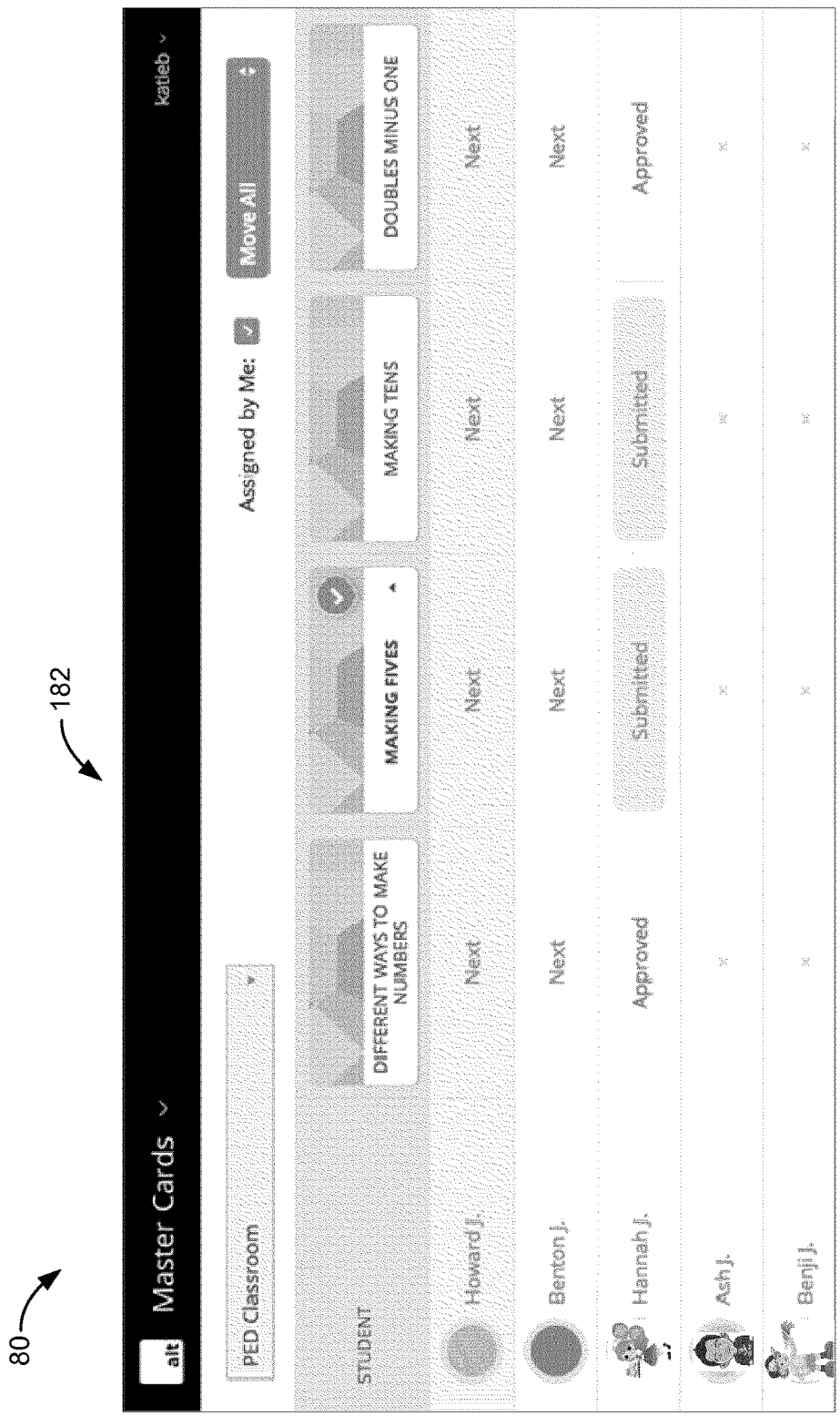
FIG. 16 shows a master card screen of a user interface according to an exemplary embodiment.

Referring now to FIGS. 15 and 16, a playlist health screen 180 and a master card screen 182 of the user interface 80 are shown according to an exemplary embodiment. In various embodiments, the playlist health screen 180 and the master card screen 182 are class wide views, allowing a teacher to monitor and change data for a group of students. For example, a teacher can use class wide views such as the playlist health screen 180 and the master card screen 182 to manage playlists and goals at a group level, such as to create goals for multiple students, streamline learning activities for a group of students, bulk move playlist cards, update safety information, and/or the like.

Referring now to FIGS. 17, 18, and 19, the class capture tool 16 is shown according to an exemplary embodiment. In various embodiments, the class capture tool 16 allows a user to collect image data and/or other data related to a physical object or document, such as an image of a three-dimensional project, presentation, diorama, document, or the like, in the learning environment. With reference to FIGS. 1, 17, 18, and 19, in various embodiments the class capture tool 16 is an application loaded onto and executed by the image capture device 18. For example, in some embodiments, the image capture device 18 is a digital camera, mobile phone, tablet, scanner, or other electronic device executes the class capture tool 16 to capture and store an image as an electronic file. In some embodiments, the class capture tool 16 may be used to capture another type of media, such as video or audio.

In various embodiments, the image data is captured by the image capture device 18 by selecting an add media button 190 in the class capture tool 16. In some embodiments, the add media button 190 instructs third party software to activate, allowing the user to collect still image, video, and/or audio data. In some embodiments, the add media button 190 prompts the user to select an existing still image, video, and/or audio file stored on the image capture device 18. In various embodiments, once the image, video, and/or audio file has been selected or created, it is shown as a thumbnail 191. In some embodiments, multiple image, video, and/or audio files may be added using the class capture tool 16. In various embodiments, the image, video, and/or audio file is added to an existing digital card by selecting an add to existing button 192 in the class capture tool 16. In some embodiments, the add to existing button 192 links the user to the user interface 80 (refer to FIG. 7A) to select an existing digital card from a student's playlist to which to add the image, video, and/or audio file. In various embodiments, the image capture device 18 transmits the image, video, and/or audio file to the assessment computing device 30 for inclusion with a digital card, and the assessment computing device 30 allows for later retrieval of the image, video, and/or audio file for display with other information from the associated digital card.

In various embodiments, the image, video, and/or audio file can be used to create a new digital card using a create new card button 194 in the class capture tool 16. Also, in various embodiments, the user can add one or more students to create cards for using the captured media by selecting an add student input field 195 in the class capture tool 16. In various embodiments, the add student input field 195 presents to the user a list of possible students from the database 36 for selection. In various embodiments, the user can add a title and description by selecting an add title and description input field 196 in the class capture tool 16. In various embodiments, a status field 197 in the class capture tool 16 displays the status of the current digital card, such as submitted, waiting to be submitted, or the like. Once the media has been captured, and the student input field 195 and the add title and description input field 196 have been filled in, the user can submit the media and create the digital card by selecting a create card button 198. In some embodiments, the create card button 198 is not selectable (e.g., greyed out) until all required information has been entered. In various embodiments, upon clicking the create card button 198, the image capture device 18 transmits the new digital card to the assessment computing device 30 for storage in the database 36. In various embodiments, the user can cancel the capture process by selecting a clear button 199 in the class capture tool 16. As shown in FIG. 19, in various embodiments the class capture tool 16 displays a confirmation message to the user once the captured media is added to an existing digital card or has been used to create and submit a new digital card.

With reference to FIGS. 1-4, 5A, 5B, 6, 7A, 7B, and 8-19, the system 10 in accordance with various embodiments includes the image capture device 18 and the assessment computing device 30. In various embodiments, the image capture device 18 is configured to capture an image of the physical object 20 and a first score associated with the physical object 20 on a first scale. In various embodiments, the assessment computing device 30 is configured to receive the image of the physical object 20 and the first score from the image capture device 18, and is configured to receive a second score on a second scale that is different from the first scale from one or more of the third party assessment source computing devices 44. In some embodiments, the assessment computing device 30 is also configured to normalize the second score to a particular scale, such as the first scale or some other common scale, to provide a normalized second score, and is configured to determine a level of mastery based at least partially on the first score and the normalized second score. Also, in some embodiments, the assessment computing device 30 is further configured to generate the user interface 80 with information indicating the level of mastery.

In various embodiments, the system 10 further includes the printer 26 and the computing device 23. In some embodiments, the computing device 23 is configured to generate a request to the assessment computing device 30 for the label 22 to be printed by the printer 26 that is affixable to the physical object 20. In some embodiments, the assessment computing device 30 is further configured to generate the label 22 to include encoded data that is readable by the image capture device 18 and the score input area 27 in which the first score is to be indicated. In various embodiments, the system 10 further includes the one or more recording devices 28 and the trigger device 29. In some embodiments, the one or more recording devices 28 are configured to capture video from the learning environment 12 in which the physical object 20 is located, and to provide one or more files with the captured video to the assessment computing device 30. In some embodiments, the trigger device 29 is configured to supply a trigger signal to the assessment computing device 30 in response to an action of a user. In some embodiments, the assessment computing device 30 is further configured to flag a location in the one or more files based on a time associated with the trigger signal.

In various embodiments, the assessment computing device 30 is configured to receive scores from a plurality of the third party assessment source computing devices 44 for a student, and is configured to receive scores for a plurality of educator assessments for the student, and is configured to determine whether the student has mastered a particular standard based at least partially on the scores received from the plurality of the third party assessment source computing devices 44 and the scores received for the plurality of educator assessments. In some embodiments, the assessment computing device 30 is configured to generate the user interface 80 to include information for a plurality of domains within a subject and a plurality of grade levels, and to provide an indication for each domain of the plurality of domains and grade level of the plurality of grade levels to indicate a corresponding level of mastery of the domain at the grade level by a student based on a plurality of scores received from different sources, such as from the third party assessment source computing devices 44, the computing device 23, the image capture device 18, and/or the user computing device 42, over the network 40 by the assessment computing device 30.

In various embodiments, the assessment computing device 30 is configured to generate the user interface 80 to display a summary of progress of a student with respect to a plurality of standards associated with a domain of a subject, and the assessment computing device 30 is configured to determine the progress of the student with respect to the plurality of standards based at least partially on a plurality of scores received from different sources over the network 40 by the assessment computing device 30. In some embodiments, the assessment computing device 30 is configured to generate the user interface 80 as an interactive user interface to permit interacting with learning progression information for a student to obtain more detailed information for selections made within the user interface 80.

In some embodiments, the assessment computing device 30 is configured to automatically suggest personalized activities for a student based at least partially on a plurality of scores received from different sources over the network 40 by the assessment computing device 30. Also, in some embodiments, the assessment computing device 30 is configured to automatically determine a grouping of students from among a plurality of students for an activity based at least partially on a grouping strategy and learning progressions of each of the plurality of students. The grouping strategy may specify, for example, whether to group strong students together with each other, to group weaker students together with each other, to group some strong students with some weaker students in a given subject area, to group some students with strong leadership skills together with some students that have weaker leadership skills, and/or the like. In various embodiments, the assessment computing device 30 is configured to generate the user interface 80 to show, for each of a plurality of domains within a subject, a level of mastery of a student for the domain, and to be interactive to permit requesting additional information in the user interface 80 for levels of proficiency of a student with respect to one or more standards corresponding to a selected domain.

Figure 20:
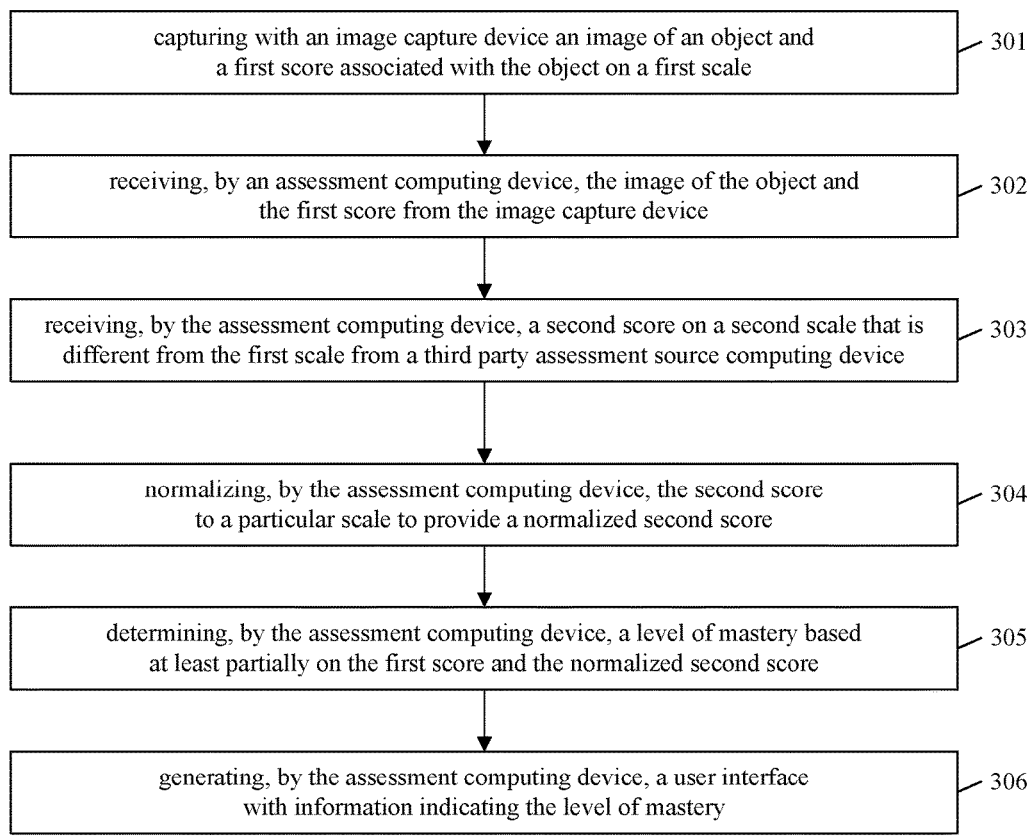
FIG. 20 shows a method in accordance with an embodiment.

FIG. 20 shows a method in accordance with an embodiment. In step 301 the method includes capturing with an image capture device an image of an object and a first score associated with the object on a first scale. In step 302 the method includes receiving, by an assessment computing device, the image of the object and the first score from the image capture device. In step 303 the method includes receiving, by the assessment computing device, a second score on a second scale that is different from the first scale from a third party assessment source computing device. In step 304 the method includes normalizing, by the assessment computing device, the second score to a particular scale, such as the first scale or another common scale, to provide a normalized second score. In step 305 the method includes determining, by the assessment computing device, a level of mastery based at least partially on the first score and the normalized second score. In step 306 the method includes generating, by the assessment computing device, a user interface with information indicating the level of mastery.

Figure 21:
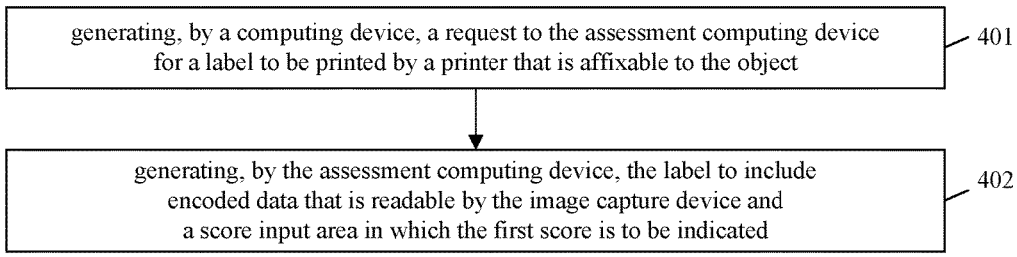
FIG. 21 shows a method in accordance with an embodiment.

FIG. 21 shows a method in accordance with an embodiment that may be practiced along with the method of FIG. 20. In step 401 the method includes generating, by a computing device, a request to the assessment computing device for a label to be printed by a printer that is affixable to the object. In step 402 the method includes generating, by the assessment computing device, the label to include encoded data that is readable by the image capture device and a score input area in which the first score is to be indicated.

Figure 22:
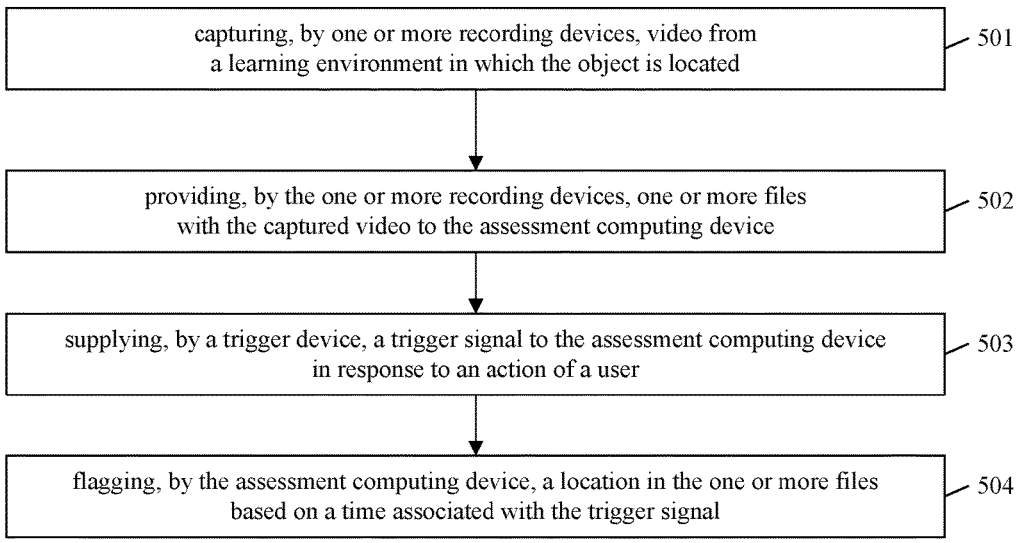
FIG. 22 shows a method in accordance with an embodiment.

FIG. 22 shows a method in accordance with an embodiment that may be practiced along with the method of FIG. 20. In step 501 the method includes capturing, by one or more recording devices, video from a learning environment in which the object is located. In step 502 the method includes providing, by the one or more recording devices, one or more files with the captured video to the assessment computing device. In step 503 the method includes supplying, by a trigger device, a trigger signal to the assessment computing device in response to an action of a user. In step 504 the method includes flagging, by the assessment computing device, a location in the one or more files based on a time associated with the trigger signal.

Figure 23:
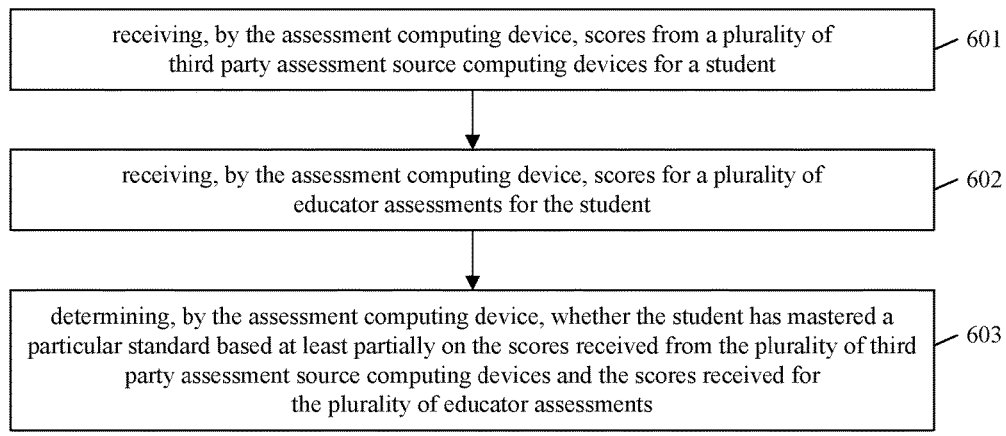
FIG. 23 shows a method in accordance with an embodiment.

FIG. 23 shows a method in accordance with an embodiment that may be practiced along with the method of FIG. 20. In step 601 the method includes receiving, by the assessment computing device, scores from a plurality of third party assessment source computing devices for a student. In step 602 the method includes receiving, by the assessment computing device, scores for a plurality of educator assessments for the student. In step 603 the method includes determining, by the assessment computing device, whether the student has mastered a particular standard based at least partially on the scores received from the plurality of third party assessment source computing devices and the scores received for the plurality of educator assessments. In various embodiments, the assessment computing device generates the user interface to include information for a plurality of domains within a subject and a plurality of grade levels, and to provide an indication for each domain of the plurality of domains and grade level of the plurality of grade levels to indicate a corresponding level of mastery of the domain at the grade level by a student based on a plurality of scores received from different sources over a network by the assessment computing device.

Figure 24:
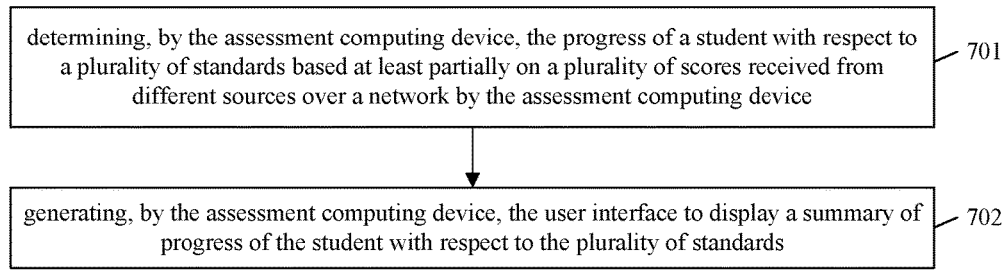
FIG. 24 shows a method in accordance with an embodiment.

FIG. 24 shows a method in accordance with an embodiment that may be practiced along with the method of FIG. 20. In step 701 the method includes determining, by the assessment computing device, the progress of a student with respect to a plurality of standards based at least partially on a plurality of scores received from different sources over a network by the assessment computing device. In step 702 generating the user interface includes generating, by the assessment computing device, the user interface to display a summary of progress of the student with respect to the plurality of standards. FIG. 25 shows a method in accordance with an embodiment that may be practiced along with the method of FIG. 20. In step 801 generating the user interface includes generating, by the assessment computing device, the user interface as an interactive user interface to permit interacting with learning progression information for a student to obtain more detailed information for selections made within the user interface.

FIG. 26 shows a method in accordance with an embodiment that may be practiced along with the method of FIG. 20. In step 901 the method includes automatically suggesting, by the assessment computing device, personalized activities for a student based at least partially on a plurality of scores received from different sources over a network by the assessment computing device. FIG. 27 shows a method in accordance with an embodiment that may be practiced along with the method of FIG. 20. In step 1001 the method includes automatically determining, by the assessment computing device, a grouping of students from among a plurality of students for an activity based at least partially on a grouping strategy and learning progressions of each of the plurality of students. FIG. 28 shows a method in accordance with an embodiment that may be practiced along with the method of FIG. 20. In step 1101 generating the user interface includes generating, by the assessment computing device, the user interface to show for each of a plurality of domains within a subject a level of mastery of a student for the domain, and to be interactive to permit requesting additional information in the user interface for levels of proficiency of a student with respect to one or more standards corresponding to a selected domain.

The construction and arrangement of the systems and methods as shown in the various exemplary embodiments are illustrative only. Many modifications are possible, such as variations in sizes, dimensions, structures, shapes, proportions, values of parameters, arrangements, colors, orientations, etc. For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using computer processors, or by a special purpose computer processor for an appropriate system, incorporated for this or another purpose, networked systems or by a hardwired system. Embodiments within the scope of the present disclosure include program products comprising machine-readable media or computer-readable media for carrying or having machine-executable instructions or data structures stored thereon for performing any of the operations and functions disclosed herein. Such computer-readable media can be any available media that can be accessed by a general purpose or special purpose computer or other machine with a processor. By way of example, such computer-readable media can comprise random access memory (RAM), read only memory (ROM), erasable programmable read-only memory (EPROM), a compact disc or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of computer-readable media. Machine-executable instructions include, for example, instructions and data which cause a general purpose computer, special purpose computer, or special purpose processing machines to perform a certain function or group of functions. The machine-executable instructions may be executed on any type of computing device, such as a server, computer, laptop, etc., or may be embedded on any type of electronic device.

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished using programming techniques with rule based logic and other logic to accomplish the various processing steps.

What is claimed is:

1. A system, comprising:
an image capture device that is configured to capture an image of an object and a first score associated with the object on a first scale;
an assessment computing device that is configured to receive the image of the object and the first score from the image capture device, and is configured to receive a second score on a second scale that is different from the first scale from a third party assessment source computing device, and is configured to normalize the second score to a particular scale to provide a normalized second score, and is configured to determine a level of mastery based at least partially on the first score and the normalized second score, and is configured to generate a user interface with information indicating the level of mastery;
a printer; and
a computing device for generating a request to the assessment computing device for a label to be printed by the printer that is affixable to the object;
wherein the assessment computing device is further configured to generate the label to include encoded data that is readable by the image capture device and a score input area in which the first score is to be indicated.

2. The system of claim 1, further comprising:
one or more recording devices for capturing video from a learning environment in which the object is located, and for providing one or more files with the captured video to the assessment computing device; and
a trigger device that is configured to supply a trigger signal to the assessment computing device in response to an action of a user;
wherein the assessment computing device is further configured to flag a location in the one or more files based on a time associated with the trigger signal.

3. The system of claim 1,
wherein the assessment computing device is configured to receive scores from a plurality of third party assessment source computing devices for a student, and is configured to receive scores for a plurality of educator assessments for the student, and is configured to determine whether the student has mastered a particular standard based at least partially on the scores received from the plurality of third party assessment source computing devices and the scores received for the plurality of educator assessments.

4. The system of claim 1,
wherein the assessment computing device is configured to generate the user interface to include information for a plurality of domains within a subject and a plurality of grade levels, and to provide an indication for each domain of the plurality of domains and grade level of the plurality of grade levels to indicate a corresponding level of mastery of the domain at the grade level by a student based on a plurality of scores received from different sources over a network by the assessment computing device.

5. The system of claim 1,
wherein the assessment computing device is configured to generate the user interface to display a summary of progress of a student with respect to a plurality of standards associated with a domain of a subject; and
wherein the assessment computing device is configured to determine the progress of the student with respect to the plurality of standards based at least partially on a plurality of scores received from different sources over a network by the assessment computing device.

6. The system of claim 1,
wherein the assessment computing device is configured to generate the user interface as an interactive user interface to permit interacting with learning progression information for a student to obtain more detailed information for selections made within the user interface.

7. The system of claim 1,
wherein the assessment computing device is configured to automatically suggest personalized activities for a student based at least partially on a plurality of scores received from different sources over a network by the assessment computing device.

8. The system of claim 1,
wherein the assessment computing device is configured to automatically determine a grouping of students from among a plurality of students for an activity based at least partially on a grouping strategy and learning progressions of each of the plurality of students.

9. The system of claim 1,
wherein the assessment computing device is configured to generate the user interface to show for each of a plurality of domains within a subject a level of mastery of a student for the domain, and to be interactive to permit requesting additional information in the user interface for levels of proficiency of a student with respect to one or more standards corresponding to a selected domain.

10. A method, comprising:
capturing with an image capture device an image of an object and a first score associated with the object on a first scale;
receiving by an assessment computing device, the image of the object and the first score from the image capture device;
receiving, by the assessment computing device, a second score on a second scale that is different from the first scale from a third party assessment source computing device;

normalizing, by the assessment computing device, the second score to a particular scale to provide a normalized second score;

determining, by the assessment computing device, a level of mastery based at least partially on the first score and the normalized second score; and generating, by the assessment computing device, a user interface with information indicating the level of mastery;

wherein the method further comprises:

generating, by a computing device, a request to the assessment computing device for a label to be printed by a printer that is affixable to the object; and generating, by the assessment computing device, the label to include encoded data that is readable by the image capture device and a score input area in which the first score is to be indicated.

11. The method of claim 10, further comprising:

capturing, by one or more recording devices, video from a learning environment in which the object is located;

providing, by the one or more recording devices, one or more files with the captured video to the assessment computing device;

supplying, by a trigger device, a trigger signal to the assessment computing device in response to an action of a user; and flagging, by the assessment computing device, a location in the one or more files based on a time associated with the trigger signal.

12. The method of claim 10, further comprising:

receiving, by the assessment computing device, scores from a plurality of third party assessment source computing devices for a student;

receiving, by the assessment computing device, scores for a plurality of educator assessments for the student; and determining, by the assessment computing device, whether the student has mastered a particular standard based at least partially on the scores received from the plurality of third party assessment source computing devices and the scores received for the plurality of educator assessments.

13. The method of claim 10, wherein the assessment computing device generates the user interface to include information for a plurality of domains within a subject and a plurality of grade levels, and to provide an indication for each domain of the plurality of domains and grade level of the plurality of grade levels to indicate a corresponding level of mastery of the domain at the grade level by a student based on a plurality of scores received from different sources over a network by the assessment computing device.

14. The method of claim 10, further comprising:

determining, by the assessment computing device, the progress of a student with respect to a plurality of standards based at least partially on a plurality of scores received from different sources over a network by the assessment computing device;

wherein generating the user interface includes generating, by the assessment computing device, the user interface to display a summary of progress of the student with respect to the plurality of standards.

15. The method of claim 10, wherein generating the user interface includes generating, by the assessment computing device, the user interface as an interactive user interface to permit interacting with learning progression information for a student to obtain more detailed information for selections made within the user interface.

16. The method of claim 10, further comprising:

automatically suggesting, by the assessment computing device, personalized activities for a student based at least partially on a plurality of scores received from different sources over a network by the assessment computing device.

17. The method of claim 10, further comprising:

automatically determining, by the assessment computing device, a grouping of students from among a plurality of students for an activity based at least partially on a grouping strategy and learning progressions of each of the plurality of students.

18. The method of claim 10, wherein generating the user interface includes generating, by the assessment computing device, the user interface to show for each of a plurality of domains within a subject a level of mastery of a student for the domain, and to be interactive to permit requesting additional information in the user interface for levels of proficiency of a student with respect to one or more standards corresponding to a selected domain.

* * * * *